(12) United States Patent
Sakai

(10) Patent No.: US 10,330,918 B1
(45) Date of Patent: Jun. 25, 2019

(54) DISPLAY DEVICE SUPPORT PLATE HAVING RECESSED REGION

(71) Applicant: AMAZON TECHNOLOGIES, INC., Seattle, WA (US)

(72) Inventor: Toru Sakai, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 15/350,662

(22) Filed: Nov. 14, 2016

(51) Int. Cl.
  *G02B 26/00* (2006.01)
  *G02B 26/08* (2006.01)
  *G02F 1/29* (2006.01)
  *G02B 5/20* (2006.01)

(52) U.S. Cl.
  CPC ............. *G02B 26/005* (2013.01); *G02B 5/20* (2013.01); *G02B 2207/115* (2013.01)

(58) Field of Classification Search
  CPC ...... G02B 26/005; G02B 26/02; G02B 5/201; G02B 26/004; G02B 2207/115; G02B 26/007; G02B 26/04; G02B 5/0284; G02B 27/4233; G02B 5/003; G02B 5/0215; G02B 5/0226; G02B 5/0236; G02B 5/0273; G02B 5/0278; G02B 5/223; G02B 6/002; G02B 6/0036

USPC ........ 359/237, 265–267, 273, 290–292, 296, 359/295, 298, 315, 321

See application file for complete search history.

(56) References Cited

U.S. PATENT DOCUMENTS 9,547,167 B1 * 1/2017 Sakai ................... G02B 26/005

* cited by examiner

*Primary Examiner* — Brandi N Thomas
(74) *Attorney, Agent, or Firm* — EIP US LLP

(57) ABSTRACT

A display device includes a first support plate and a second support plate. A pixel region between the first support plate and the second support plate includes a plurality of pixel wall portions over the first support plate forming a perimeter of the pixel region. A first liquid and a second liquid that is immiscible with the first liquid are disposed in the pixel region. A light-blocking layer is disposed on an inner surface of the second support plate. The light-blocking layer includes a light-blocking portion positioned over a first pixel wall portion of the plurality of pixel wall portions. An electrically conductive layer comprising an electrically conductive portion is disposed on a first surface of the light-blocking portion. A recessed region is aligned with the electrically conductive portion such that a portion of the second liquid disposed within the recessed region contacts the electrically conductive portion.

20 Claims, 13 Drawing Sheets

DISPLAY DEVICE SUPPORT PLATE HAVING RECESSED REGION

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
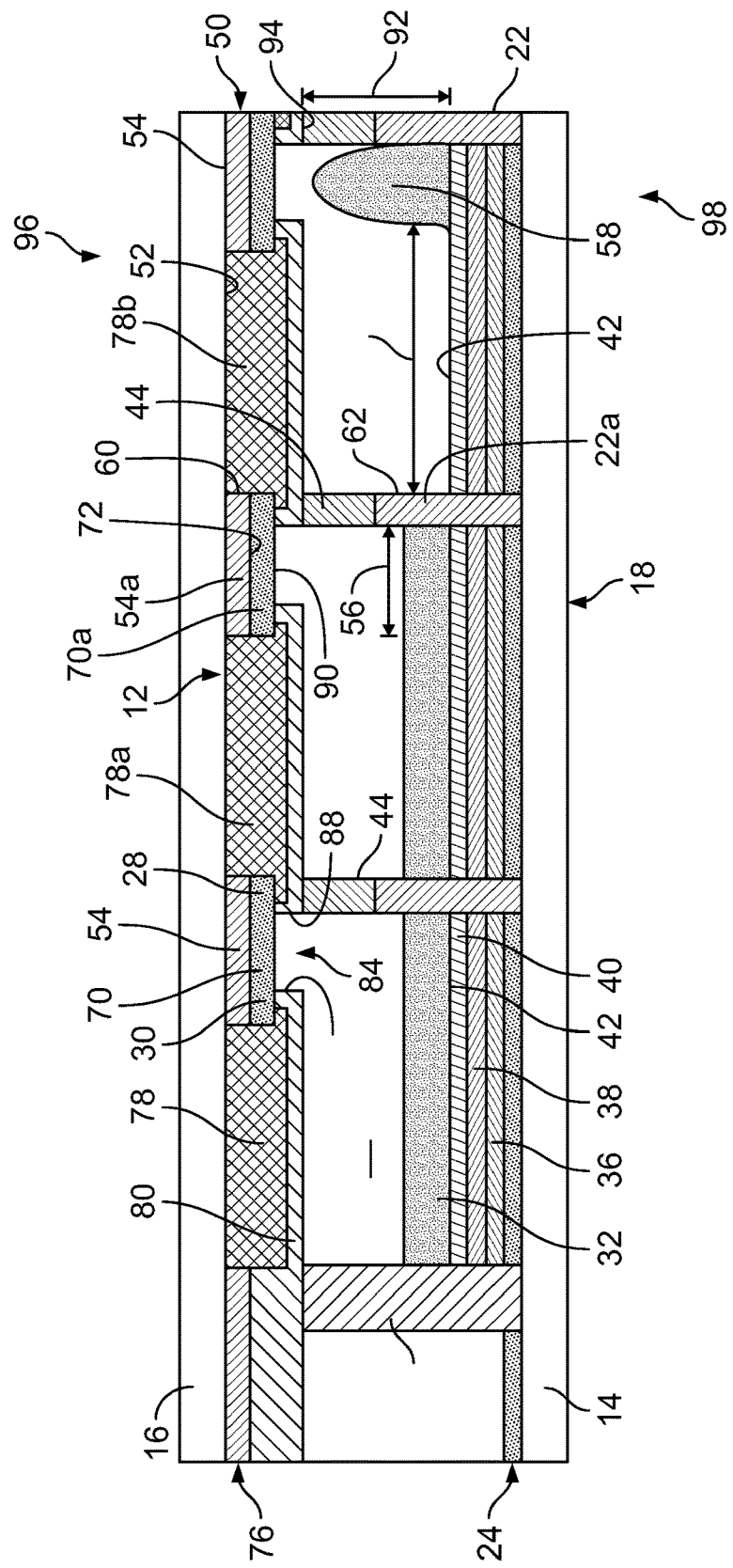
FIG. 1 is a cross-sectional view of a portion of an example electrowetting display device including adjacent electrowetting pixel regions, according to various embodiments.

In example embodiments described herein, a light-blocking layer, such as an organic material layer, e.g., a black matrix organic material layer, is disposed on an inner surface of a top support plate. The light-blocking layer includes a plurality of light-blocking portions on the inner surface of the top support plate. Each light-blocking portion of the plurality of light-blocking portions is positioned over, e.g., aligned with, a pixel wall portion forming at least a portion of a perimeter of an associated electrowetting pixel region. In certain embodiments, the plurality of light-blocking portions forms a first grid pattern on the inner surface of the top support plate. A recessed region is aligned with, e.g., positioned over an inner surface of, each light-blocking portion. In example embodiments, an electrically conductive layer is disposed on the light-blocking layer. More specifically, the electrically conductive layer includes a plurality of electrically conductive portions forming a second grid over the first grid pattern of light-blocking portions. Each electrically conductive portion is disposed on at least a portion of a respective light-blocking portion such that the electrically conductive layer forms a continuous common electrode associated with each pixel region. In certain embodiments, the electrically conductive layer is disposed in the recessed region and positioned over an area of the pixel region, e.g., a first area, such as a first liquid collection area, of a hydrophobic surface of the pixel region, in which the first liquid, e.g., oil, forms a droplet with the first liquid in a contracted state.

In example embodiments, a color filter portion is disposed on the inner surface of the top support plate adjacent the light-blocking portion. A conforming layer including a photo-definable material, e.g., a planarization layer, such as a suitable organic planarization layer, is disposed on or over the color filter portion. The conforming layer at least partially forms a recessed region or trench including sidewalls over at least a portion of a respective electrically conductive portion. The recessed region is aligned with, e.g., positioned over, a first or inner surface of the respective electrically conductive portion. In an alternative embodiment, the electrically conductive layer is associated with, e.g., positioned within, the pixel region but not disposed in the recessed region.

In certain embodiments, the color filter portion has a thickness of 2.0 micrometers to 4.0 micrometers and the conforming layer has a thickness of 1.0 micrometers to 3.0 micrometers. With a light-blocking portion having a thickness of 1.0 micrometer to 2.0 micrometers, for example, and the electrically conductive layer having a thickness of 100 nanometers to 300 nanometers, in certain embodiments the recessed region may provide an additional 1.0 micrometer to about 5.0 micrometers to provide sufficient clearance between the common electrode and the oil as the oil contracts to form the droplet with the oil in the contracted state. As a result, a distance, referred to as a cell gap, of the electrowetting pixel region between a hydrophobic surface of the pixel region and a first or inner surface of the conforming layer can be decreased. In example embodiments described herein, the distance is defined by a height of a spacer coupled between the pixel wall portion and the conforming layer and at least a portion of a height of the pixel wall portion. In example embodiments, the distance is less than 20 micrometers and, more particularly, the distance is not greater than 15 micrometers and, even more particularly, the distance is 15 micrometers. When an electrical potential is applied between a pixel region electrode and a common electrode on the top support plate, the associated pixel region is activated, e.g., is in an activate state. The first fluid, e.g., a first liquid such as an electrowetting oil, in the activated pixel region contracts to form a droplet under the light-blocking portion formed on an inner surface of the top support plate. In at least some conventional electrowetting display devices, the light-blocking portion has a width extending into the electrowetting pixel region of about 30 micrometers in order to extend over the oil droplet, having a width or diameter of 20 micrometers to 22 micrometers, and the respective pixel wall portion, having a width of 8 micrometers to 10 micrometers.

In many conventional electrowetting display devices, the cell gap is defined between an inner surface of a top support plate and a surface of the pixel region over the bottom support plate. A main factor determining the cell gap is a height of a spacer positioned between the top support plate and the bottom support plate, e.g., coupled between a pixel wall portion and the top support plate. In conventional display devices, an aspect ratio of the spacer, i.e., a ratio of a height of the spacer (h) and a width of a base of the spacer contacting a contact surface of the respective pixel wall portion (w) is relatively high. This relatively high aspect ratio may create a significant mechanical force on the underlying material layer, e.g., the underlying ITO layer, during processing, particularly at various temperature changes during the processing steps. The mechanical force created between the spacer and the underlying material layer can form cracks in the underlying material layer. While this crack formation can be avoided by removing the ITO material under the spacer at the edges of the display area, the ITO material in the display area cannot be removed because the ITO material must be continuously connected as the common electrode within the display area. As a result, one or more contact points may appear within the display area where a spacer contacts a surface of the ITO material layer.

In electrowetting display devices, the electrically conductive layer, e.g., the ITO layer, on the top support plate functions to apply a specific potential to a second fluid, e.g., a second liquid such as an electrolyte solution, disposed within the pixel region. When the physical and electrical contact between the electrically conductive layer and the electrolyte solution is made via a contact area, e.g., within the recessed region, the specific potential is applied to the electrolyte solution and the electrolyte solution functions as a common electrode for the pixel region. In example embodiments described herein, an electrowetting display device includes an electrowetting pixel region, such as an electrowetting sub-pixel, having an electrically conductive layer, e.g., an indium tin oxide (ITO) layer, disposed on an inner surface of a light-blocking portion. A color filter layer is disposed on the inner surface of the top support plate. The color filter layer is coplanar with the light-blocking layer and includes a plurality of color filter portions each adjacent one or more respective light-blocking portions. A conforming layer is disposed over each color filter portion to form a recessed region aligned with a respective portion of the electrically conductive layer. The recessed region provides the contact area between the electrically conductive layer and the electrolyte solution. A spacer is coupled between a respective pixel wall portion and the inner surface of the conforming layer adjacent the recessed region. A distance between the inner surface of a hydrophobic layer of the pixel region and the inner surface of the conforming layer, defined by a height of the spacer and at least a portion of a height of the pixel wall portion coupled to the spacer, is sufficient to allow the oil in the electrowetting sub-pixel to form a droplet under and, in certain embodiments, extending into, the recessed region without contacting the electrically conductive layer.

In example embodiments, the light-blocking layer and the electrically conductive layer can be patterned in a similar "self-aligning" design. As a result of the self-aligning design, a total resistance of the common electrode is lowered because the common electrode formed by the electrically conductive layer has a grid pattern within the display area. Additionally, the spacers in the display area are applied directly on the conforming layer, which results in reducing or eliminating undesirable contact points or "crossover" between the electrically conductive layer and the spacers, as well as significantly improving an adhesion between the spacers and the conforming layer. Moreover, because the innermost surface of the top support plate includes only the organic conforming layer, the subsequent surface treatment step is simplified. Further, because the light-blocking layer is formed on the top support plate as a flat surface with a generally planar topography, no planarization layer is required over the light-blocking layer. As a result, materials other than ITO that are inert and inactive to the electrolyte solution within the pixel region, such as a suitable metal material, e.g., chromium, titanium, molybdenum, tungsten, and/or tantalum, can be used to form the transparent electrically conductive layer. In alternative embodiments, the transparent electrically conductive layer includes zinc oxide or fluorine-doped tin oxide. In further alternative embodiments, the transparent electrically conductive layer includes an organic material including, without limitation, poly(3,4-ethylenedioxythiophene)(PEDOT) or poly(styrene sulfonate)(PDOT:PSS).

Figure 2:
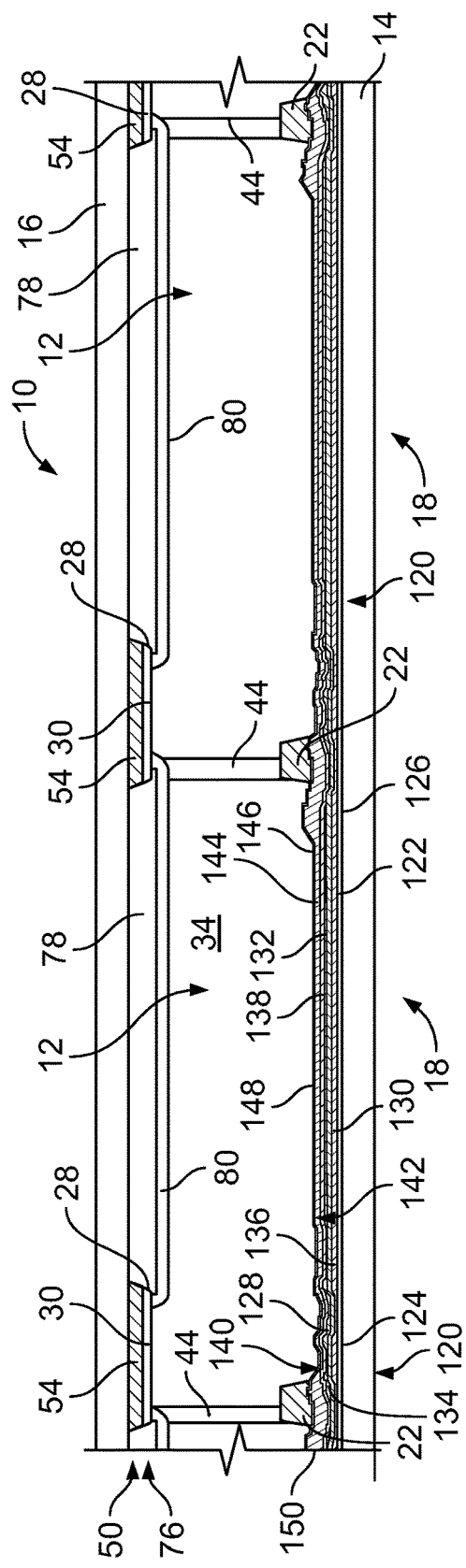
FIG. 2 is a cross-sectional view of a portion of an example electrowetting display device including adjacent electrowetting pixel regions, according to various embodiments.

Referring now to the figures, FIG. 1 is a cross-sectional view of a portion of an example electrowetting display device, such as a reflective electrowetting display device 10, according to various embodiments. While the example embodiments described herein are related to a reflective display device, the example embodiments may also be suitable for use with alternative display technology including, for example, a transmissive or transflective display device. FIG. 1 shows two electrowetting pixel regions in a resting state and one electrowetting pixel region in an active state. With the electrowetting pixel regions in a resting state, the first fluid, e.g., a liquid such as an electrowetting oil, is dispersed across a hydrophobic surface of the pixel region. With the electrowetting pixel region in an active state, the first fluid, e.g., a liquid such as an electrowetting oil, contracts to form a droplet in a first area of the hydrophobic surface, e.g., a first liquid collection area. FIG. 2 is a cross-sectional view of a portion of an example electrowetting display device, such as a reflective electrowetting display device 10, including adjacent electrowetting pixel regions between opposing support plates of the electrowetting display device, e.g., a first electrowetting pixel region and an adjacent second electrowetting pixel region arranged in a column of a plurality of electrowetting pixel regions, according to various embodiments.

As shown in FIG. 1, each electrowetting pixel region includes an active portion, e.g., a display surface area. More specifically, in this embodiment, the display surface area is defined by pixel wall portions, as described below, having a first dimension, such as a width, between opposing lateral pixel wall portions, and a second dimension, such as a height, between the remaining opposing pixel wall portions. The electrowetting display device may include any number (usually a very large number, such as thousands or millions) of electrowetting pixel regions.

Referring further to FIG. 1, a plurality of pixel regions, such as electrowetting pixel regions 12, is positioned over a first or bottom support plate 14, e.g., positioned between bottom support plate 14 and a second or top support plate 16 opposing bottom support plate 14. In example embodiments, electrowetting pixel region 12 includes an electrowetting sub-pixel 18 formed over bottom support plate 14 to define a display surface area 20, as shown in FIG. 1. A plurality of pixel wall portions 22 is formed over bottom support plate 14 to form a perimeter of each electrowetting pixel region 12. In the example embodiment, pixel wall portions 22 may include a photoresist material such as, for example, epoxy-based negative photoresist SU-8. Electrowetting pixel regions 12 may have a width and a height in a range of about 50 to 500 micrometers, for example. In certain embodiments, a pixel region may include a pixel, a sub-pixel, or a pixel having two or more sub-pixels of a display device. Such pixels or sub-pixels may be the smallest light transmissive, reflective or transflective unit of a display that is individually operable to directly control an amount of light transmission through or reflection from the pixel region. For example, in some embodiments, a pixel region may include a red sub-pixel, a green sub-pixel, a blue sub-pixel, or a white sub-pixel for RGBW displays. In other embodiments, a pixel may be a smallest component, e.g., the pixel does not include any sub-pixels.

An electrode layer 24 having a plurality of pixel electrodes 26 is formed on bottom support plate 14, for example, between electrowetting pixel regions 12 and bottom support plate 14. Electrode layer 24 and/or one or more pixel electrodes 26 are operatively coupled to an electrically conductive layer 28 forming a second or common electrode 30 positioned under top support plate 16. In conjunction with common electrode 30, electrode layer 24 creates a voltage differential between electrode layer 24 and common electrode 30 to cause relative displacement of a first fluid 32, e.g., an oil, and a second fluid 34, e.g., a liquid electrolyte solution, within electrowetting pixel region 12. These example embodiments are not limiting with respect to the location of the first and second electrode, and claimed subject matter is not limited in this respect. In particular embodiments, one or more additional layers may be positioned between electrode layer 24 and bottom support plate 14, in which TFT structures, gates, and/or source lines are located, for example. In these embodiments, electrode layer 24 may not be formed directly on bottom support plate 14. In various embodiments, electrode layer 24 may be connected to any number of transistors, such as suitable thin film transistor (TFT) structures (not shown in FIG. 1), that are switched to either select or deselect corresponding electrowetting pixel regions 12 using active matrix addressing, for example. A TFT structure is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 36 is positioned adjacent, e.g., on or over electrode layer 24, as shown in FIGS. 1 and 2, for example. In particular embodiments, one or more additional layers may be positioned between reflective layer 36 and electrode layer 24. In these embodiments, reflective layer 36 may not be formed directly on electrode layer 24. In an alternative embodiment, reflective layer 36 is positioned under a transparent electrode layer. In this alternative embodiment, reflective layer 36 is positioned between the transparent electrode layer 24 and bottom support plate 14. Reflective layer 36 may reflect light within the entire visible spectrum, making the layer appear relatively bright, or reflect a portion of light within the visible spectrum, making the layer have a color. In this embodiment, reflective layer 36 is positioned within the pixel region, e.g., within each electrowetting pixel region 12, to provide specular reflection.

As shown in FIG. 1, in the example embodiment, reflective layer 36 is positioned on electrode layer 24 and in electrowetting pixel region 12. In alternative embodiments, reflective layer 36 is position on electrode layer 24 and under electrowetting pixel region 12. In certain embodiments, reflective layer 36 includes one or more suitable materials such as, for example, a metal (90%, 95% or greater than 95% metal), an alloy, a doped metal, and/or a dielectric reflective material. Suitable metal materials for reflective layer 36 include, without limitation, aluminum, silver, gold, copper, nickel, platinum, rhodium, lanthanum, and/or silicon nickel. Suitable alloy materials for reflective layer 36 include, without limitation, aluminum with copper or aluminum with nickel. In further alternative embodiments, reflective layer 36 is made of any suitable material providing a desired specular reflectance. In alternative embodiments, reflective layer 36 includes a suitable diffuse reflective material deposited on or over electrode layer 24. In this alternative embodiment, any suitable diffuse reflective material, such as titanium dioxide ($TiO_2$), providing a desired diffuse reflectance may be used.

Electrowetting pixel regions 12 may have specific and/or additional structural features. Additionally or alternatively, reflective layer 36 may have structural features, for example, one or more relatively thinner areas and/or one or more relatively thicker areas within reflective layer 36 to control movement of the fluids. Alternatively, reflective layer 36 may be deposited on a structural feature conforming to a shape of the structural feature.

A suitable dielectric barrier layer 38 may at least partially separate electrode layer 24 and reflective layer 36 from a hydrophobic layer 40, such as an amorphous fluoropolymer layer forming a hydrophobic surface 42 of electrowetting pixel region 12. For example, dielectric barrier layer 38 in certain embodiments is deposited on reflective layer 36. Dielectric barrier layer 38 may be formed from various materials including one or more organic material layers or a combination of organic and inorganic material layers. A thickness of the insulating dielectric barrier layer 38 may be less than 2 micrometers and may be less than 1 micrometer; for example, the insulating dielectric barrier layer 38 may be 100 nanometers to 800 nanometers in thickness in certain embodiments. In some embodiments, hydrophobic layer 40 is an amorphous fluoropolymer layer including any suitable fluoropolymer(s), such as AF1600®, produced by DuPont, based in Wilmington, Del. Hydrophobic layer 40 is transparent in the example embodiment. Reflective layer 36 below hydrophobic layer 40 may reflect light within the entire visible spectrum, making the layer appear white, or reflect a portion of light within the visible spectrum, making the layer have a color. As described above, in certain embodiments, reflective layer 36 itself can act both as a pixel electrode and a reflective layer.

First fluid 32, which may have a thickness (e.g., a height) in a range of about 1 micrometer to 10 micrometers, for example, overlays hydrophobic layer 40, as shown in FIG. 1. First fluid 32 is partitioned by pixel wall portions 22. Second fluid 34, such as a liquid electrolyte solution, overlays first fluid 32 and pixel wall portions 22. In certain embodiments, as described above, second fluid 34 may be electrically conductive and/or polar. For example, second fluid 34 may be water or a water solution, or a salt solution such as a solution of potassium chloride in water or a mixture of water and ethyl alcohol. In certain embodiments, second fluid 34 is transparent, but may be colored or absorbing. First fluid 32 is electrically non-conductive and may, for example, be an alkane like hexadecane or (silicone) oil. As described herein, first fluid 32 is immiscible with second fluid 34.

As described above, hydrophobic layer 40 is arranged over bottom support plate 14 to create hydrophobic surface 42. The hydrophobic character of hydrophobic layer 40 causes first fluid 32 to adjoin preferentially to hydrophobic layer 40 because first fluid 32 has a higher wettability with respect to hydrophobic surface 42 of hydrophobic layer 40 than second fluid 34 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Top support plate 16 covers second fluid 34 and one or more spacers 44 to maintain second fluid 34 in electrowetting pixel regions 12. In one embodiment, spacer 44 extends between pixel wall portion 22 and conductive electrode layer 28. In alternative embodiments, spacer 44 does not rest on pixel wall portion 22 but is substantially aligned with pixel wall portion 22. This arrangement may allow spacer 44 to come into contact with pixel wall portion 22 upon a sufficient pressure or force being applied to top support plate 16. An edge seal 46 extends about a perimeter of electrowetting display device 10 to contain first fluid 32 and second fluid 34 within electrowetting pixel regions 12. A voltage applied across, among other things, second fluid 34 and electrode layer 24 of individual electrowetting pixel regions 12 may control transmittance or reflectance of the individual electrowetting pixel regions 12.

Figure 5:
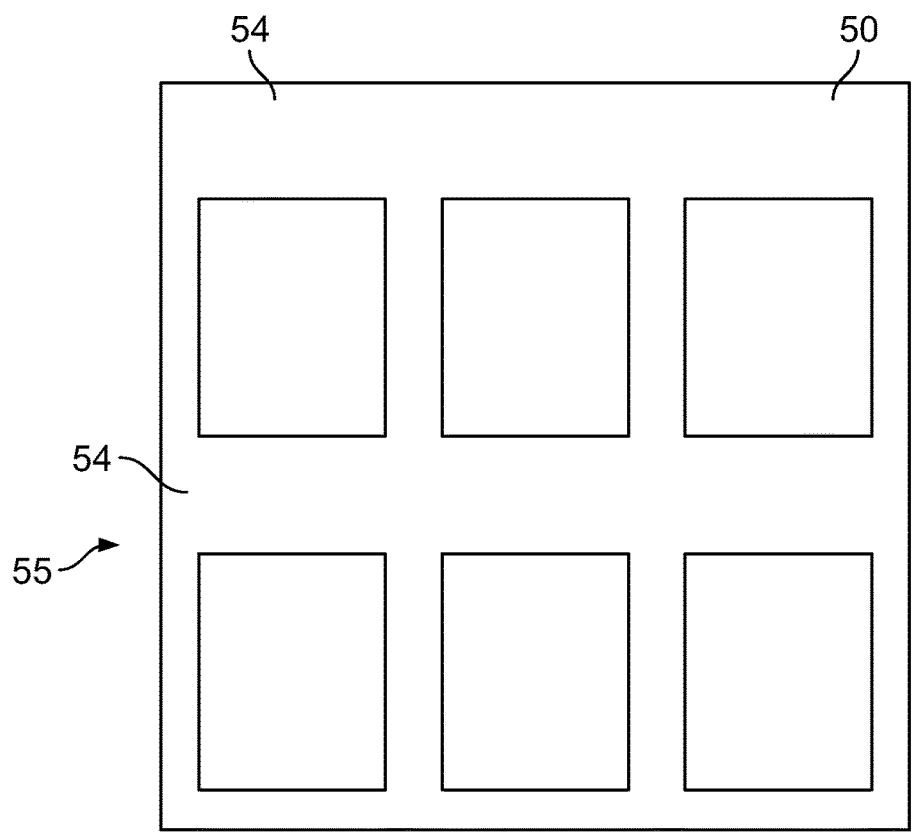
FIGS. 5-18 are schematic views of a portion of a color filter structure of the example electrowetting display device during various steps of the example method illustrated in FIG. 4.

In example embodiments, a light-blocking layer 50 is disposed on top support plate 16. For example, in certain embodiments, light-blocking layer 50 is disposed on an inner surface 52 of top support plate 16. Light-blocking layer 50 includes a plurality of light-blocking portions 54 disposed on, e.g., deposited or formed on, inner surface 52 of top support plate 16. In certain embodiments, light-blocking portions 54 are coupled to form a first grid pattern 55 of light-blocking portions 54 on inner surface 52 of top support plate 16 (as shown in FIG. 5). In these embodiments, light-blocking portion 54 (or light-blocking portions 54) positioned over the respective TFT structure(s), as described below, may have a width greater than a width of the remaining light-blocking portions 54 associated with a respective pixel region 12.

As shown in FIG. 1, a first light-blocking portion 54a is positioned over a first pixel wall region 22a of the plurality of pixel wall portions 22. First light-blocking portion 54a extends over an area, e.g., a first liquid collection area 56, of electrowetting pixel region 12 in which first fluid 32 forms a droplet 58 with first fluid 32 in a contracted state when electrowetting pixel region is activated. In certain embodiments, first liquid collection area 56 includes an area of hydrophobic surface 42 under first light-blocking portion 54a, for example, that is adjacent or a portion of display surface area 20, as shown in FIG. 1. In a particular embodiment, a first edge 60 of first light-blocking portion 54a is positioned over and aligned with a corresponding first edge 62 of first pixel wall portion 22a. First light-blocking portion 54a extends over or into first electrowetting pixel region 12 (in a plane of light-blocking layer 50 parallel to inner surface 52 of top support plate 16) to cover first liquid collection area 56. In example embodiments, electrowetting pixel region 12 has a first dimension, e.g., a width, of 60 micrometers and a second dimension, e.g., a height, perpendicular to the first dimension of 120 micrometers. In these embodiments, first liquid collection area 56 has a dimension of 20 micrometers to 22 micrometers along the second dimension of electrowetting pixel region 12 and first pixel wall portion 22a has a dimension of 8 micrometers to 10 micrometers along the second dimension of electrowetting pixel region 12. In order to extend over droplet 58 in first liquid collection area 56, in certain embodiments, first light-blocking portion 54a has a dimension of 30 micrometers along the second dimension of electrowetting pixel region 12.

Figure 7:
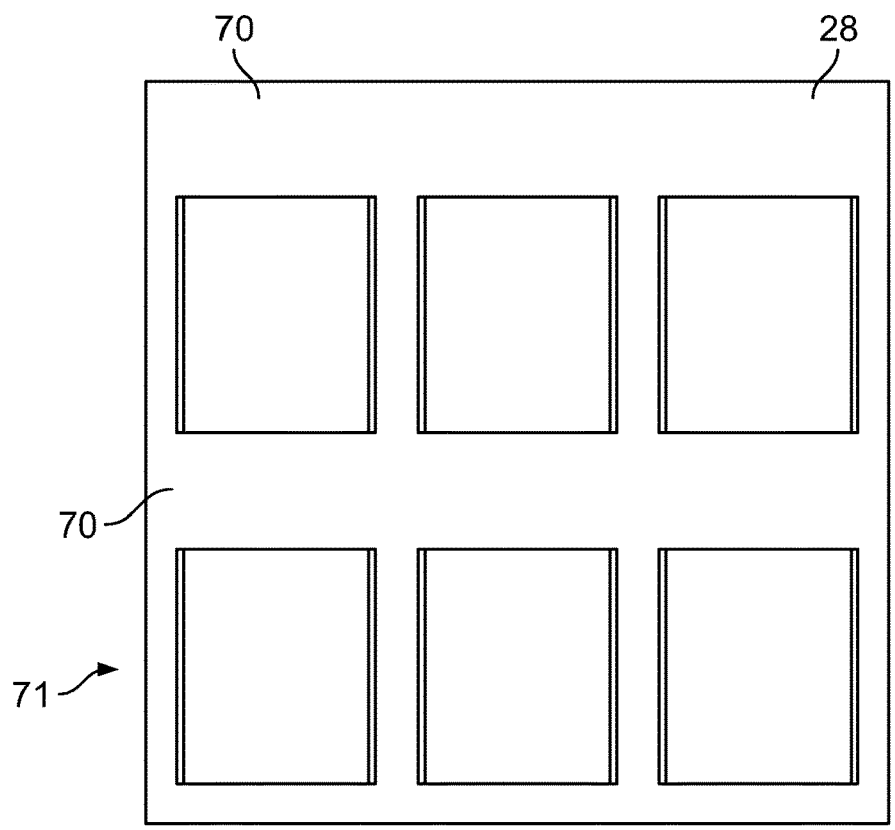

In example embodiments, electrically conductive layer 28, e.g., an indium tin oxide (ITO) layer, forming common electrode 30 associated with each electrowetting pixel region 12 is disposed on and contacts light-blocking layer 50. For example, in certain embodiments, In certain embodiments, electrically conductive layer 28 includes a plurality of electrically coupled portions 70 coupled to form a second grid pattern 71 of electrically conductive portions 54 on associated light-blocking portions 54 (as shown in FIG. 7). For example, at least a portion of electrically conductive layer 28, e.g., an electrically conductive portion 70 as shown in FIGS. 1 and 2, is disposed on and contacts a first or inner surface 72 of an associated light-blocking portion 54, e.g., a first electrically conductive portion 70a is disposed on and contacts a first or inner surface 72 of associated first light-blocking portion 54a. In example embodiments, electrically conductive layer 28 includes a transparent layer, e.g., a transparent indium tin oxide (ITO) layer, forming a plurality of electrically conductive portions 70. In alternative embodiments, electrically conductive layer 28 may include any suitable electroconductive material including, without limitation, a suitable metal material such as chromium, titanium, molybdenum, tungsten, and/or tantalum. In example embodiments, electrically conductive portion 70 is aligned with or positioned over first liquid collection area 56 of electrowetting pixel region 12 in which first fluid 32 forms droplet 58 with first fluid 32 in a contracted state.

In example embodiments, electrowetting display device 10 includes one or more color filter layers 76 disposed on inner surface 52 of top support plate 16 and coplanar with light-blocking layer 50. As shown in FIG. 1, color filter layer 76 is disposed on, e.g., formed or deposited on, inner surface 52 of top support plate 16 using a suitable method. Color filter layer 76 includes a plurality of color filter portions, collectively referred to as color filter portions 78. In example embodiments, each color filter portion 78 is positioned in a respective electrowetting pixel region 12. Each color filter portion 78 may be configured to be substantially transparent to particular ranges of wavelengths of light, while absorbing others. For example, a red color filter portion 78 may be transparent to red light having wavelengths ranging from 620 nanometers (nm) to 750 nm, while absorbing light having other wavelengths. A blue color filter portion 78 may be transparent to blue light having wavelengths ranging from 450 nm to 495 nm, while absorbing light having other wavelengths. Green color filter portion 78 may be transparent to green light having wavelengths ranging from 495 nm to 570 nm, while absorbing light having other wavelengths. Transparent (white) color filter portion 78 may be transparent to all wavelengths of visible light, namely white light. As used herein, visible light refers to wavelengths of electromagnetic radiation visible to the human eye. Generally, this includes electromagnetic radiation having wavelengths between about 400 nm to about 800 nm.

Color filter portions 78, therefore, may be utilized to assign each electrowetting pixel region 12, e.g., each electrowetting sub-pixel, a color, so that when a particular electrowetting sub-pixel is in an open state, light reflected by that electrowetting sub-pixel will take on the color of the color filter portion associated with that electrowetting sub-pixel. In other embodiments, different ranges of light wavelengths may be associated with the red color filter portion, the green color filter portion, and the blue color filter portion. In still other embodiments, color filter portions 78 may be configured to block or transmit electromagnetic radiation of different wavelengths entirely. For example, electrowetting display device 10 may be configured to generate images using electrowetting sub-pixels having color filter portions 78 configured to transmit electromagnetic radiation of the colors cyan, magenta, and yellow. In short, color filter portions 78 may be developed and utilized within electrowetting display device 10 in accordance with any display color model.

Color filter portions 78 may be constructed with a generally transparent material such as a photoresist material or photo-definable polymer, including electromagnetic radiation filtering materials suspended within the material. Color filter portions 78 may be formed by the addition of pigments or dyes to a clear photo-definable polymer, for example. The amount of additive depends on system requirements, such as absorbance or transmission specifications. In some cases, polyacrylates are used as photoresist material. Generally, the organic dyes and pigments used within color filter portions 78 can have molecular structures containing chromophoric groups generating the color filtering properties. Some examples for chromophoric groups are azo-, anthraquinone-, methine- and phtalocyanine-groups. Color filter portions 78 may also be formed using a dichromated gelatin doped with a photosynthesizer, dyed polyimides, resins, and the like.

In a particular embodiment, each color filter portion 78 is configured to overlay an associated electrowetting pixel region 12 so that each color filter portion 78 extends from one pixel wall portion 22 on a first side of electrowetting pixel region 12 to an opposing pixel wall portion 22 on a second side of electrowetting pixel region 12. In one embodiment, electrowetting display device 10 includes a combination of red, blue, green, and transparent (white) color filter portions 78, with one color filter portion 78 being positioned in or over each electrowetting pixel region 12. Using color filter portions 78, each electrowetting pixel region 12 in electrowetting display device 10 can be associated with a particular wavelength of electromagnetic radiation. By controlling which electrowetting pixel regions 12 are active within electrowetting display device 10, electrowetting display device 10 can generate color images viewable by a user.

In example embodiments, light-blocking layer 50 includes one or more light-blocking portions 54, e.g., including a black matrix material such as a suitable photoresist material, disposed and positioned around at least a portion of each color filter portion 78 to form a perimeter around at least a portion of the associated color filter portion 78. In example embodiments, the black matrix material is aligned with or positioned over pixel wall portions 22. More specifically, a plurality of light-blocking portions 54 are aligned over the plurality of pixel wall portions 22 and form first grid pattern 55 on inner surface 52. For example, in certain embodiments, each light-blocking portion 54 is aligned over a respective pixel wall portion 22 of the plurality of pixel wall portions 22. As shown in FIG. 1, electrowetting display device 10 includes first light-blocking portion 54a positioned over first pixel wall portion 22a. More specifically, first light-blocking portion 54a is positioned along an edge of color filter portion 78a, between color filter portion 78a and an adjacent color filter portion 78b. Color filter portions 78 are adjacent when they are next to one another in the display device with no intervening color filter portion 78. Light-blocking portion 54a is formed between color filter portion 78a and color filter portion 78b such that light-blocking portion 54a is between the adjacent color filter portion 78a and color filter portion 78b. In a particular embodiment, light-blocking portion 54a has a width between color filter portion 78a and color filter portion 78b of 16.0 micrometers to 30.0 micrometers, and, more particularly, a width of 25.0 micrometers to 30.0 micrometers. In example embodiments, each color filter portion 78 is disposed over or in a respective electrowetting pixel region 12 between light-blocking portions 54 such that light-blocking portions 54 form a perimeter of each color filter portion 78. Referring further to FIG. 1, first color filter portion 54a is disposed on inner surface 52 of top support plate 16 adjacent first light-blocking portion 54a.

A conforming layer 80 having a suitable photo-definable material, such as a photo-definable polymer, is disposed over color filter layer 76 to cover each color filter portion 78, such as first color filter portion 78a. In example embodiments, conforming layer 80 includes a planarization layer, such as an organic planarization layer, disposed over, e.g., deposited or formed on, color filter layer 76 to cover each color filter portion 78 without overlying or covering at least a portion of light-blocking portion 54, e.g., without overlying or covering inner surface 72 of light-blocking portion 54a facing an interior volume of electrowetting pixel region 12.

Conforming layer 80 at least partially forms a recessed region or trench 84, which may be referred to herein as a trench or a recessed region, over a portion of electrically conductive portion 70. In example embodiments, recessed region 84 is aligned with, e.g., positioned over, first electrically conductive portion 70a to provide communication between electrically conductive portion 70a and second fluid 34, e.g., the liquid electrolyte solution disposed in electrowetting pixel region 12. As shown in FIGS. 1 and 2, recessed region 84 includes sidewalls, such as a first sidewall 86 and a second sidewall 88. In a particular embodiment, conforming layer 80 extends onto a portion of an inner surface 90 of electrically conductive portion 70. In certain embodiments, recessed region 84 includes an opening formed through a thickness of conforming layer 80. The opening is aligned with first electrically conductive portion 70a to provide fluid communication between first electrically conductive portion 70a and second fluid 34, e.g., the liquid electrolyte solution disposed in electrowetting pixel region 12 such that second fluid 34 is disposed in recessed region 84 and contacts first electrically conductive portion 70a.

In example embodiments, first light-blocking portion 54a has a thickness of 1.0 micrometer to 2.0 micrometers and, more particularly, a thickness of 1.2 micrometers to 1.5 micrometers, and electrically conductive portion 70a includes an ITO layer or ITO portion having a thickness of 100 nanometers to 300 nanometers and, more particularly, a thickness of 150 nanometers. First color filter portion 78a has a thickness of 2.0 micrometers to 4.0 micrometers and, more particularly, a thickness of 3.2 micrometers, and conforming layer 80 has a thickness of 1.0 micrometers to 3.0 micrometers and, more particularly, a thickness of 2.0 micrometers. As a result, the combined thickness of first color filter portion 78a and conforming layer 80 is between 3.0 micrometers and 7.0 micrometers, in the example embodiments. In these example embodiments, recessed region 84 provides an additional 1.0 micrometer to 5.0 micrometers (generally a difference between a combined thickness of first color filter portion 78a and conforming layer 80 and a combined thickness of first light-blocking portion 54a and first electrically conductive portion 70a) to provide sufficient clearance between common electrode 30 and first fluid 32 as first fluid 32 contracts to form droplet 58 in the contracted state. As a result, a distance 92, referred to as a cell gap, of electrowetting pixel region 12 between hydrophobic surface 42 of electrowetting pixel region 12 and a first or inner surface 94 of conforming layer 80 can be decreased. In example embodiments, referring to FIG. 1, distance 92 is defined by a height of spacer 44 coupled between first pixel wall portion 22a and conforming layer 80 and at least a portion of a height of first pixel wall portion 22a. In example embodiments, distance 92 is less than 20 micrometers and, more particularly, distance 92 is not greater than 15 micrometers and, even more particularly, distance 92 is 15 micrometers. In alternative embodiments, distance 92 is at least 20 micrometers.

With first fluid 32 and second fluid 34 that is immiscible with first fluid 32 disposed within electrowetting pixel region 12, second fluid 34 contacts common electrode 30. As shown in FIG. 1, with electrowetting pixel region 12 in an active state, first fluid 32 forms droplet 58 in first liquid collection area 56 with first fluid 32 in a contracted state. In certain example embodiments, a height of droplet 58, e.g., a height of first fluid 32 in the contracted state, is greater than distance 92 such that droplet 58 extends into recessed region 84, as shown in FIG. 1. In alternative embodiments, the height of droplet 58 is less than distance 92 and, thus, does not extend into recessed region 84. Electrode layer 24 positioned over bottom support plate 14 is coupled to common electrode 30 for creating a voltage differential between electrode layer 24 and common electrode 30 to cause displacement of first fluid 32 to expose at least a portion of reflective layer 36.

Reflective electrowetting display device 10 has a viewing side 96 corresponding to top support plate 16 through which an image formed by reflective electrowetting display device 10 may be viewed, and an opposing rear side 98 corresponding to bottom support plate 14 as shown, for example, in FIG. 1. Reflective electrowetting display device 10 may be a segmented display type in which the image is built of segments. The segments may be switched simultaneously or separately. Each segment includes one electrowetting pixel region or a number of electrowetting pixel regions that may be neighboring or distant from one another. The electrowetting pixel regions included in one segment are switched simultaneously, for example. Electrowetting display device 10 may also be an active matrix driven display type or a passive matrix driven display, for example.

Referring now to FIG. 2, in certain embodiments, reflective electrowetting display device 10 includes a thin film transistor (TFT) structure 120 disposed over, e.g., formed on, bottom support plate 14 and associated with, e.g., operatively coupled to, a respective electrowetting pixel region 12. In example embodiments, TFT structure 120 is positioned in electrowetting pixel region 12 and operatively coupled to common electrode 30 positioned under top support plate 16 for creating, in conjunction with common electrode 30, a voltage differential between TFT structure 120 and common electrode 30 to cause displacement of first fluid 32 (not shown in FIG. 2), e.g., a liquid such as an opaque electrowetting oil, in electrowetting pixel region 12, e.g., in electrowetting sub-pixel 18.

Each TFT structure 120 includes a first metal layer 122, e.g., an electrode layer or gate electrode layer that includes a gate 124 and a metal portion 126, disposed on or over bottom support plate 14. TFT structure 120 is coupled in signal communication with associated electrowetting sub-pixel 18 within electrowetting pixel region 12. In the example embodiment, TFT structure 120 is switched to either select (activate) or deselect (deactivate) associated electrowetting sub-pixel 18 using active matrix addressing, for example.

A silicon layer, such as a silicon semiconductor layer 128, e.g., a silicon semiconductor layer including an active amorphous silicon, is disposed on or over, e.g., formed or deposited on, a suitable non-conducting substrate, such as a dielectric layer or first passivation layer 130, shown in FIG. 2, which may include a silicon nitride layer, for example.

A second metal layer 132 is disposed, e.g., formed or deposited on, on first passivation layer 130 and at least a portion of silicon semiconductor layer 128. Second metal layer 132 includes a suitable metal material, such as ITO. Second metal layer 132 forms a source 134 and a drain 136 of TFT structure 120. Source 134 includes a source line not shown in FIG. 2, to electrically couple source 134 to a source driver for transmitting signals to or from the source driver for driving, e.g., activating or deactivating, electrowetting sub-pixel 18. In example embodiments, source 134 and drain 136 are positioned over silicon semiconductor layer 128 and, in combination, cover a first portion of silicon semiconductor layer 128 leaving a second portion of the silicon semiconductor layer uncovered. A second passivation layer 138, e.g., a passivation layer comprising silicon nitride, is disposed on, e.g., formed or deposited on or over, second metal layer 132. Second passivation layer 138 is made of a suitable material to isolate source 134 and drain 136 from ambient conditions.

A conducting channel region 140, formed between source 134 and drain 136, is susceptible to undesirable photoleakage current. In one embodiment, second passivation layer 138 is at least partially positioned on or in conducting channel region 140 and contacts at least a portion of silicon semiconductor layer 128. In certain embodiments, light-blocking portion 54 has suitable dimensions to extend over at least a portion of source 134, at least a portion of drain 136, and silicon semiconductor layer 128 entirely to act as a light shield to protect silicon semiconductor layer 128, which is highly photosensitive, from undesirable exposure to light. In example embodiments, light-blocking portion 54 has suitable dimensions to extend over silicon semiconductor layer 128 to block, e.g., absorb, light and prevent or limit light entering electrowetting pixel regions 12 from impinging on the respective TFT structure 120, e.g., on a surface of silicon semiconductor layer 128. For example, light-blocking portion 54 has a length and a width greater than a respective length and width of silicon semiconductor layer 128. More particularly, silicon semiconductor layer 128 has a first width along a width of gate 124 and a first length perpendicular to the first width and light-blocking portion 54 has a second width along the width of gate 124 greater than the first width and a second length perpendicular to the second width greater than the first length.

A contact, such as a contact hole 142 or a piece of conductive material is formed through a thickness of second passivation layer 138 to electrically couple a third metal layer, e.g., a reflective layer 144 disposed on or over, e.g., formed or deposited on, second passivation layer 138 to drain 136 formed in second metal layer 132 positioned under second passivation layer 138. In example embodiments, reflective layer 144 is electrically coupled to drain 136 of second metal layer 132. In certain embodiments, reflective layer 144 can act as a pixel electrode and a reflective layer. In example embodiments, reflective layer 144 may include any suitable material including, for example, a metal (90%, 95% or greater than 95% metal), an alloy, a doped metal, or a dielectric reflective material. Suitable metal materials for reflective layer 144 include, without limitation, aluminum, silver, gold, copper, nickel, platinum, rhodium, lanthanum, and/or silicon nickel. Suitable alloy materials for reflective layer 144 include, without limitation, aluminum with copper or aluminum with nickel. In further alternative embodiments, reflective layer 144 is made of any suitable material providing a desired specular reflectance. In alternative embodiments, reflective layer 144 includes a suitable diffuse reflective material deposited on or over second passivation layer 138. In this alternative embodiment, any suitable diffuse reflective material, such as titanium dioxide ($TiO_2$), providing a desired diffuse reflectance may be used.

Referring further to FIG. 2, one or more dielectric barrier layers 146 may at least partially separate respective TFT structure 120 from a hydrophobic layer 148. More specifically, in the embodiment shown in FIG. 2, dielectric barrier layer 146 at least partially separates reflective layer 144 from hydrophobic layer 148, such as an amorphous fluoropolymer layer forming a bottom surface of respective electrowetting sub-pixel 18. For example, dielectric barrier layer 146 may be disposed on, e.g., formed or deposited on, reflective layer 144. Dielectric barrier layer 146 may include various materials including one or more organic material layers or a combination of organic and inorganic material layers. A thickness of the insulating dielectric barrier layer 146 may be less than 2 micrometers and may be less than 1 micrometer; for example, insulating dielectric barrier layer 146 may be 100 nanometers to 800 nanometers in thickness in certain embodiments. In example embodiments, hydrophobic layer 148 is an amorphous fluoropolymer layer including any suitable fluoropolymer(s), such as AF1600® fluoropolymer produced by DuPont based in Wilmington, Del. Hydrophobic layer 148 is transparent in the example embodiments.

An additional organic material layer 150 is disposed on, e.g., formed or deposited on, a portion of dielectric barrier layer 146 near and/or under pixel wall portion 22. Organic material layer 150 may include any suitable organic material including, without limitation, a polyacrylate, an epoxy, or a polyimide material, and combinations thereof.

In example embodiments, one or more pixel wall portions 22 form a patterned electrowetting pixel grid pattern over, e.g., on, hydrophobic layer 148. Pixel wall portions 22 may include a photoresist material such as, for example, an epoxy-based negative photoresist material SU-8. The patterned electrowetting pixel grid pattern includes a plurality of rows and a plurality of columns of pixel wall portions 22 that form a perimeter of each electrowetting pixel region in an array of electrowetting pixel regions. Each electrowetting pixel region 12 may have a width and a height in a range of about 50 to 500 micrometers, for example, and, more particularly, in one embodiment, electrowetting pixel regions 12 have a width of 60 micrometers and a height of 120 micrometers.

As described above, first fluid 32, e.g., a liquid such as an opaque electrowetting oil, which may have a thickness in a range of 1 micrometer to 10 micrometers, for example, overlays hydrophobic layer 148. First fluid 32 is partitioned by pixel wall portions 22. Second fluid 34, e.g., a liquid such as a liquid electrolyte solution, overlays first fluid 32 and, in certain embodiments, at least a portion of pixel wall portions 22. In certain embodiments, as described above, second fluid 34 may be electrically conductive and/or polar. For example, second fluid 34 may be water or a water solution, or a salt solution such as a solution of potassium chloride in water or a mixture of water and ethyl alcohol. In certain embodiments, second fluid 34 is transparent, but may be colored or absorbing. First fluid 32 is electrically non-conductive and may, for example, be an alkane-like hexadecane or (silicone) oil. As described herein, second fluid 34 is immiscible with first fluid 32. Light transmission through the electrowetting pixel regions is controlled by the application of an electric potential to the respective electrowetting pixel region, which results in a movement of second fluid 34 in the electrowetting pixel region, thereby displacing first fluid 32 in the electrowetting pixel region.

As described above, hydrophobic layer 148 is arranged on or over bottom support plate 14 to form a hydrophobic surface having an electrowetting surface area. The hydrophobic character of hydrophobic layer 148 causes first fluid 32 to adjoin preferentially to hydrophobic layer 148 because first fluid 32 has a higher wettability with respect to a top surface of hydrophobic layer 148 than second fluid 34 in the absence of a voltage. Wettability relates to the relative affinity of a fluid, e.g., a liquid, for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid, e.g., the liquid, tends to form a film on the surface of the solid.

Top support plate 16, as shown in FIGS. 1 and 2, covers second fluid 34 and one or more spacers 44 to maintain second fluid 34 over electrowetting pixel grid pattern. In example embodiments, spacers 44 are positioned between top support plate 16 and pixel wall portions 22. More specifically, in certain example embodiments, spacer 44 is coupled to a contact surface on a first or distal end of corresponding pixel wall portions 22. In certain embodiments, one or more components or layers may be positioned between top support plate 16 and spacer 44. In this arrangement, a contact surface of spacer 44 contacts a contact surface of corresponding pixel wall portion 22 to provide a stable contact joint at an interface between pixel wall portion 22 and spacer 44, providing mechanical strength at the interface that is less sensitive to overflow and/or leakage of first fluid 32 and/or second fluid 34 contained within electrowetting pixel regions 12. In alternative embodiments, spacer 44 does not rest on pixel wall portion 22 but is substantially aligned with pixel wall portion 22. This arrangement may allow spacer 44 to come into contact with pixel wall portion 22 upon a sufficient pressure or force being applied to top support plate 16. Multiple spacers 44 may be interspersed throughout the electrowetting pixel grid pattern. Edge seal 46 extends about a perimeter of electrowetting display device 10 to contain first fluid 32 and second fluid 34 within the fluid region of the display cavity. A voltage applied across, among other things, second fluid 34 and respective TFT structure 120 of individual electrowetting pixel regions 12 controls transmittance or reflectance of the associated electrowetting pixel region 12.

Spacers 44 and edge seal 46 mechanically couple bottom support plate 14 with the overlying, opposing top support plate 16, forming a separation between bottom support plate 14 and top support plate 16, and contributing to the mechanical integrity of electrowetting display device 10. Spacers 44 can be at least partially transparent so as to not hinder throughput of light in the electrowetting display. The transparency of spacers 44 may at least partially depend on the refractive index of the spacer material, which can be similar to or the same as the refractive indices of surrounding media. Spacers 44 may also be chemically inert to surrounding media. Edge seal 46, for example, disposed along a periphery of an array of electrowetting pixel regions 12, may contribute to retaining fluids (e.g., first fluid 32 and second fluid 34) between bottom support plate 14 and the overlying top support plate 16.

In various embodiments described herein, electronic devices include electrowetting displays (EWDs) for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

For a reflective EWD, when the electrowetting sub-pixel is in a resting state (i.e., the closed or off state, with no electric potential applied), the first liquid, e.g., the opaque electrowetting oil, is distributed throughout the electrowetting sub-pixel to substantially cover a display surface area of the electrowetting sub-pixel (see FIG. 1). The first liquid absorbs light and the electrowetting sub-pixel in this condition appears dark, e.g., black, in one embodiment. But when the electric potential is applied, the electrowetting sub-pixel is in an active state (i.e., an at least partially open state—the on state—with an electric potential applied), the second liquid moves into the electrowetting sub-pixel displacing the first liquid so that the first liquid is no longer distributed throughout the electrowetting sub-pixel. Light can then enter the electrowetting sub-pixel and impinge upon a surface of a reflective portion or layer, for example, positioned at or near a bottom of the electrowetting pixel region. The light is then reflected by the reflective portion or layer to reflect out of the electrowetting pixel region. If the reflective surfaces reflect only a portion of the light spectrum or if color filters are incorporated into the electrowetting pixel structure, the electrowetting sub-pixel may appear to be gray or have color.

A display device, such as an electrowetting display device, may include a transmissive, reflective or transflective display that generally includes an array of pixel regions (e.g., an array of sub-pixels) configured to be operated by an active matrix addressing scheme. For example, rows and columns of electrowetting sub-pixels are operated by controlling voltage levels on a plurality of source lines and gate lines. In this fashion, the display device may produce an image by selecting particular sub-pixels to transmit, reflect or block light. Sub-pixels are addressed (e.g., selected) via rows and columns of the source lines and the gate lines that are electrically connected to transistors (e.g., TFT structures used as switches) included in each pixel region. The transistors occupy a relatively small fraction of the area of each pixel region to allow light to efficiently pass through (or reflect from) the sub-pixel.

The array of pixel regions is sandwiched between two support plates, such as bottom support plate 14 and opposing top support plate 16. The support plates may be made of any suitable material including, without limitation, plastic, glass, quartz, and semiconducting materials, and may be made of a rigid material or a flexible material, for example. The pixel regions include various layers of materials built upon the bottom support plate, e.g., within or under the sub-pixels. One example layer is an amorphous fluoropolymer (AF1600®) with hydrophobic behavior. The pixel wall portions may be formed on a top surface of the hydrophobic layer. The bottom support plate may be opaque while the top support plate is transparent. Describing a component or material as being "transparent" generally means that the component or the material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Example embodiments described herein include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

As described above, individual reflective electrowetting pixel regions may include an electrode layer or gate electrode layer containing or coupled to the drive electronics like TFT structures, source lines, and gate lines on the bottom support plate, a reflective layer over the electrode layer, a pixel electrode adjacent to the reflective layer, a barrier layer on the reflective layer, and a hydrophobic layer on the barrier layer. The pixel electrode in principle is close to the liquids in the pixel region to minimize power consumption. In one alternative embodiment, a patterned layer of indium tin oxide (ITO) is deposited as the pixel electrode over the reflective layer. In another alternative embodiment, the pixel electrode is under the reflective layer. The electrode layer, for example, can be an electrode layer containing at least part of the drive electronics if the reflective layer is used as the electrode or the electrode layer can contain the pixel electrodes in contact with the reflective layer. Pixel wall portions of each pixel region, the hydrophobic layer, and the transparent top support plate at least partially enclose a liquid region within the display cavity that contains the first liquid which is electrically non-conductive, e.g., an opaque oil retained in the individual electrowetting sub-pixels by pixel wall portions, and the second liquid, e.g., an electrolyte solution, that is electrically conductive or polar and may be a water or a salt solution, such as a solution of potassium chloride in water. The second liquid may be transparent or may be colored. The second liquid is immiscible with the first liquid. In general, substances are "immiscible" with one another if the substances do not substantially form a solution, although in a particular embodiment the second liquid might not be perfectly immiscible with the first liquid. In general, an "opaque" liquid is a liquid that appears black to an observer. For example, an opaque liquid strongly absorbs a broad spectrum of wavelengths (e.g., including those of red, green and blue light) in the visible region of electromagnetic radiation appearing black. However, in certain embodiments an opaque liquid may absorb a relatively narrower spectrum of wavelengths in the visible region of electromagnetic radiation and may not appear perfectly black.

In some embodiments, the opaque liquid is a nonpolar electrowetting oil. In certain embodiments, the first liquid may absorb at least a portion of the visible light spectrum. The first liquid may be transmissive for a portion of the visible light spectrum, forming a color filter. For this purpose, the first liquid may be colored by addition of pigment particles or a dye. Alternatively, the first liquid may be black, for example by absorbing substantially all portions of the visible light spectrum, or reflecting. A reflective first liquid may reflect the entire visible light spectrum, making the layer appear white, or a portion of the entire visible light spectrum, making the layer have a color. In example embodiments, the first liquid is black and, therefore, absorbs substantially all portions of an optical light spectrum.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based at least in part on electronic signals representative of static image and/or video data. The code may cause the processor to modulate the optical properties of pixels by controlling electrical signals (e.g., voltages, currents, and fields) on, over, and/or in layers of the electrowetting display device.

Figure 3:
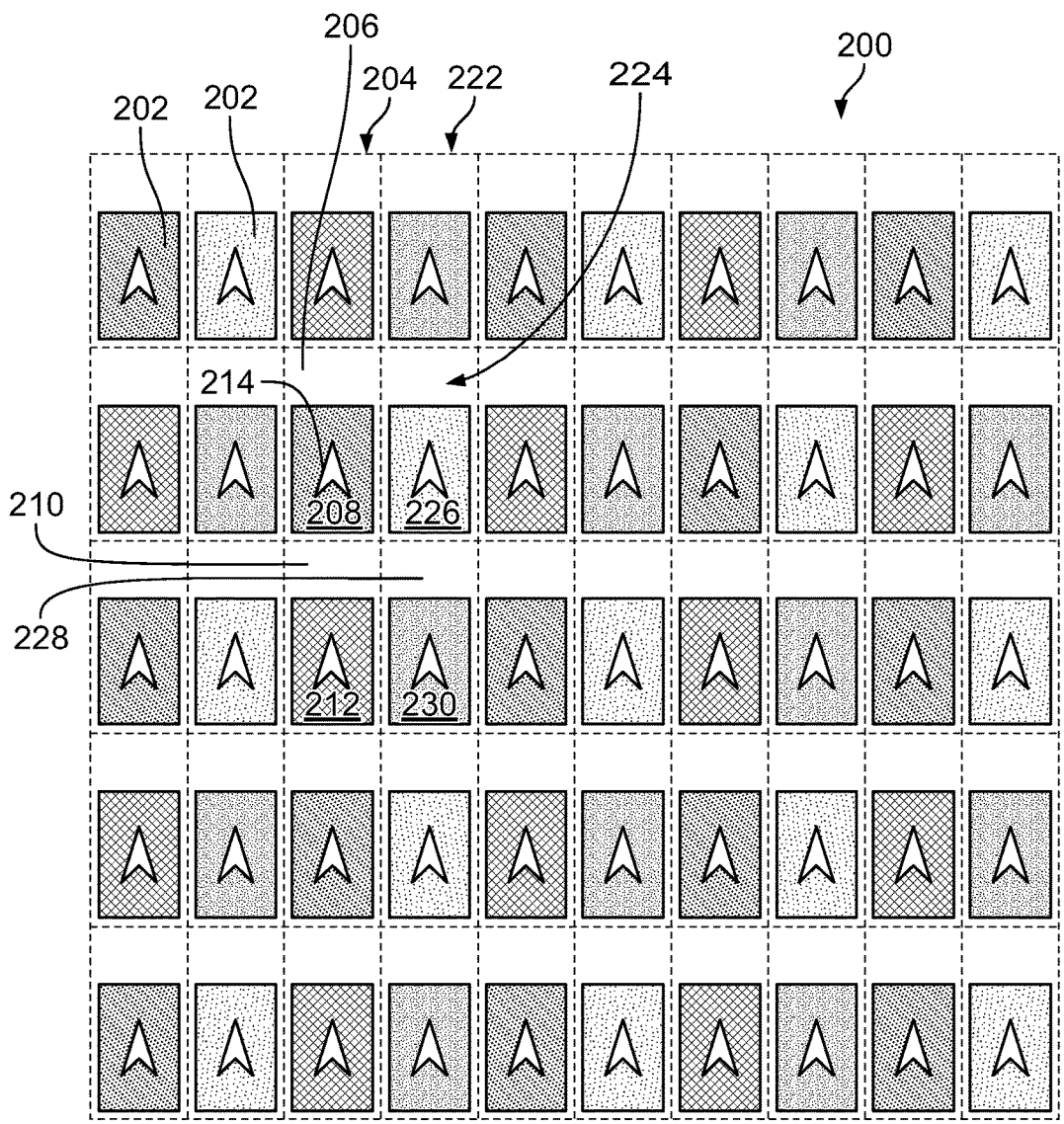
FIG. 3 is top view of a portion of an example electrowetting display device including a plurality of electrowetting pixel regions, according to various embodiments.

FIG. 3 is top view of a portion of electrowetting display device 200 including a plurality of electrowetting pixel regions 202, such as electrowetting pixel regions 12 formed over a first or bottom support plate (shown in FIGS. 1 and 2), according to one embodiment. As shown in FIG. 3, a first column 204 of electrowetting pixel regions 202 includes a first light-blocking portion 206, such as a light-blocking portion 54, positioned in or over a first (red) electrowetting pixel region 208 and a second light-blocking portion 210 positioned in or over a second (blue) electrowetting pixel region 212. When first electrowetting pixel region 208 is activated, the first fluid in first electrowetting pixel region 208 moves in a first direction 214 toward a first TFT structure, such as a respective TFT structure 120, in first electrowetting pixel region 208 adjacent a first pixel wall portion (not shown in FIG. 3) positioned under first light-blocking portion 206 and, when second electrowetting pixel region 212 is activated, the first fluid in second electrowetting pixel region 212 moves in first direction 214 toward a second TFT structure, such as a respective TFT structure 120, adjacent a second pixel wall portion positioned under second light-blocking portion 210. Similarly, a second column 222 of electrowetting pixel regions 202 adjacent first column 204 includes a third light-blocking portion 224 positioned in or over a third (green) electrowetting pixel region 226 adjacent first electrowetting pixel region 208 and a fourth light-blocking portion 228 positioned in or over a fourth (transparent (white)) electrowetting pixel region 230 adjacent second electrowetting pixel region 212. When third electrowetting pixel region 226 is activated, the first fluid in third electrowetting pixel region 226 moves in first direction 214 toward a third TFT structure, such as a respective TFT structure 120, in third electrowetting pixel region 226 adjacent a third pixel wall portion (not shown in FIG. 3) collinear with the first pixel wall portion and positioned under third light-blocking portion 224 and, when fourth electrowetting pixel region 230 is activated, the first fluid in fourth electrowetting pixel region 230 moves in first direction 214 toward a fourth TFT structure, such as a respective TFT structure 120, in fourth electrowetting pixel region 230 adjacent a fourth pixel wall portion (not shown in FIG. 3) collinear with the second pixel wall portion and positioned under fourth light-blocking portion 228.

In an example embodiment, an electrowetting display device includes a first support plate and a second support plate. A first electrowetting sub-pixel is between the first support plate and the second support plate. The first electrowetting sub-pixel includes a plurality of pixel wall portions over the first support plate forming a perimeter of the first electrowetting sub-pixel. An oil and an electrolyte solution that is immiscible with the oil are disposed in the first electrowetting sub-pixel. A light-blocking layer is disposed on an inner surface of the second support plate. The light-blocking layer includes a first light-blocking portion disposed over a first pixel wall portion of the plurality of pixel wall portions. An indium tin oxide (ITO) layer is disposed on the light-blocking layer. The ITO layer includes a first ITO portion disposed on the first light-blocking portion. A color filter layer is disposed on the inner surface of the second support plate. The color filter layer is coplanar with the light-blocking layer and includes a first color filter portion adjacent the first light-blocking portion. A layer having a photo-definable material is disposed on the color filter layer and includes a recessed region formed through a thickness of the layer. The recessed region is aligned with the first ITO portion and provides fluid communication between the first ITO portion and the electrolyte solution such that the electrolyte solution contacts the first ITO portion. In certain embodiments, a spacer is coupled between the first pixel wall portion and the layer having a photo-definable material adjacent the recessed region. A distance between a hydrophobic surface of the electrowetting sub-pixel and an inner surface of the layer having a photo-definable material is defined by a height of the spacer and at least a portion of a height of the first pixel wall portion. The ITO layer provides a common electrode associated with the first electrowetting sub-pixel. The electrowetting display device further includes a reflective layer disposed over the first support plate in the first electrowetting sub-pixel. An electrode layer is positioned over the first support plate for creating, in conjunction with the common electrode, a voltage differential between the electrode layer and the common electrode to cause displacement of the oil in the first electrowetting sub-pixel to expose at least a portion of the reflective layer.

In one embodiment, a second electrowetting sub-pixel is between the first support plate and the second support plate and adjacent the first electrowetting sub-pixel. The color filter layer further includes a second color filter portion in the second electrowetting sub-pixel and adjacent the first light-blocking portion. The layer having a photo-definable material is disposed on the second color filter portion to form the recessed region between the first color filter portion and the second color filter portion.

In another example embodiment, a display device includes a first support plate having a top surface and an opposing bottom surface and a second support plate having a first surface and an opposing second surface. A pixel region between the top surface of the first support plate and the second surface of the second support plate includes a plurality of pixel wall portions over the top surface of the first support plate forming a perimeter of the pixel region. A first liquid and a second liquid that is immiscible with the first liquid are disposed in the pixel region. A light-blocking layer is disposed on the second surface of the second support plate. The light-blocking layer includes a light-blocking portion positioned over a first pixel wall portion of the plurality of pixel wall portions. An electrically conductive layer including an electrically conductive portion is disposed on the light-blocking portion. A conforming layer is disposed over at least a portion of the second surface of the second support plate. The conforming layer includes a recessed region extending through a thickness of the conforming layer and aligned with the electrically conductive portion to provide fluid communication between the electrically conductive portion and the second liquid such that a portion of the second liquid is disposed within the recessed region and contacts the electrically conductive portion when the pixel region is open, i.e., with the pixel region in an active state. In one embodiment, a first color filter portion is disposed on the second surface of the second support plate adjacent a first side edge of the light-blocking portion, wherein the conforming layer is disposed on the first color filter portion. In one embodiment, an opening is formed through the conforming layer to form the recessed region. A second color filter portion is disposed on the second surface of the second support plate adjacent a second side edge of the light-blocking portion opposing the first side edge. In this embodiment, the conforming layer is disposed on the second color filter portion to form the recessed region between the first color filter portion and the second color filter portion. A hydrophobic layer is disposed over the first support plate. The hydrophobic layer forms a hydrophobic surface of the pixel region. A spacer is coupled between the first pixel wall portion and the conforming layer. A distance between the hydrophobic surface and a first surface of the conforming layer is defined by a height of the spacer and at least a portion of a height of the first pixel wall portion.

In one embodiment, the light-blocking layer includes a plurality of light-blocking portions forming a first grid pattern and the electrically conductive layer includes a plurality of electrically conductive portions forming a second grid pattern aligned with the first grid pattern. In this embodiment, the second grid pattern provides a continuous common electrode for the display device. The first liquid forms a droplet that extends into the recessed region with the first liquid in a contracted state.

The electrically conductive layer provides a common electrode associated with the pixel region. A reflective layer is positioned over the first support plate in the pixel region. An electrode layer is positioned over the first support plate. The electrode layer is coupled to the common electrode for creating a voltage differential between the electrode layer and the common electrode to cause displacement of the first liquid to expose at least a portion of the reflective layer.

In another example embodiment, a display device includes a first support plate having a first surface. A light-blocking layer including a light-blocking portion is disposed on the first surface of the first support plate. A transparent, electrically conductive layer is disposed on the light-blocking layer. The transparent electrically conductive layer includes an electrically conductive portion disposed on the light-blocking portion. A color filter layer is disposed on the first surface of the first support plate. The color filter layer is coplanar with the light-blocking layer and includes a color filter portion adjacent the light-blocking portion. A conforming layer is disposed on the color filter layer and a recessed region extends through the conforming layer and is aligned with the electrically conductive portion. The light-blocking layer includes a plurality of light-blocking portions forming a first grid pattern and the transparent, electrically conductive layer includes a plurality of electrically conductive portions forming a second grid pattern aligned with the first grid pattern. The second grid pattern provides a continuous common electrode for the electrowetting display device. Each electrically conductive portion of the plurality of electrically conductive portions is aligned with and disposed on a respective light-blocking portion of the plurality of light-blocking portions. In example embodiments, a spacer is disposed on the conforming layer and positioned adjacent the recessed region. A second support plate is coupled to the first support plate. The second support plate having a first surface. A hydrophobic layer is disposed over the first surface of the second support plate. A plurality of pixel wall portions is disposed on the hydrophobic layer. The plurality of pixel wall portions forms a perimeter of a pixel region such that the spacer is coupled to a first pixel wall portion of the plurality of pixel wall portions and a height of the spacer and at least a portion of a height of the first pixel wall portion define a distance between the conforming layer and the hydrophobic layer. A second support plate is coupled to the first support plate. The second support plate has a first surface. A plurality of pixel wall portions is formed over the first surface of the second support plate. The plurality of pixel wall portions forms a perimeter of a pixel region. A first liquid and a second liquid that is immiscible with the first liquid are disposed in the pixel region. The recessed region includes an opening extending through a thickness of the conforming layer to provide fluid communication between the transparent, electrically conductive portion and the second liquid. In certain embodiments, the conforming layer is disposed on a portion of light-blocking portion and the recessed region includes an opening extending through a thickness the conforming layer.

Figure 4:
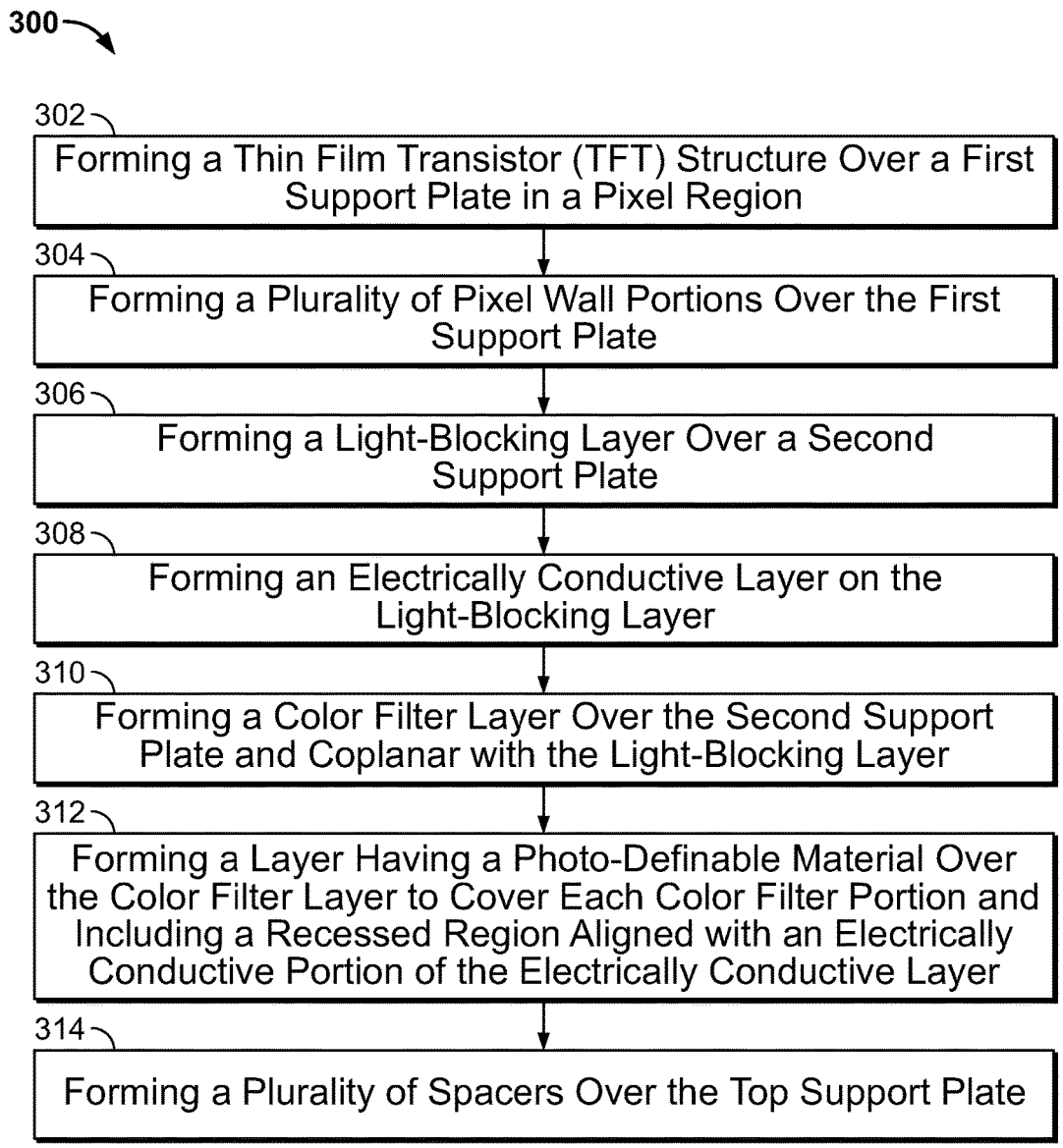
FIG. 4 illustrates an example method for fabricating an electrowetting display device such as shown in FIGS. 1-3, according to various embodiments.

FIG. 4 is a flow diagram of an example method 300 for fabricating an electrowetting display device, such as electrowetting display device 10, as shown in FIGS. 1 and 2, or electrowetting display device 200 as shown in FIG. 3. FIGS. 5-18 are cross-sectional schematic views of a portion of the color filter structure of the example electrowetting display device during various steps of the method illustrated in FIG. 4. Though claimed subject matter is not limited in this respect, method 300 may be performed manually (e.g., by humans) and/or using automated equipment. At block 302, a thin film transistor (TFT) structure is formed over a first support plate in a pixel region adjacent a first pixel wall portion partially forming a perimeter of the first pixel region. In one embodiment, forming 302 a TFT structure over the first support plate includes forming a first metal layer over the first support plate. The first metal layer includes a gate. In an example embodiment, the first metal layer is deposited on the first support plate using a suitable physical vapor deposition process (PVD) such as sputtering. Additional layers may be positioned between the first metal layer and the first support plate. In certain embodiments, a gate line is formed to operatively couple a gate driver to the TFT structure. The gate driver is configured to activate the associated electrowetting pixel regions as described herein.

A first passivation layer, e.g., a dielectric layer, is formed over, e.g., deposited on, the first metal layer. In example embodiments, the first passivation layer includes a suitable silicon nitride layer. Alternatively, the first passivation layer may include SiON, SiO, or TaO, for example. Any suitable deposition technique may be used, such as CVD, PVD, MBE, or a sputtering technique, for example. A silicon layer, e.g., a semiconductor layer, such as a silicon semiconductor layer including an amorphous silicon material, is formed on the first passivation layer and over the gate. A second metal layer is formed over the first metal layer and on the silicon layer. The second metal layer includes a source and a drain covering a first portion of the silicon layer. A second passivation layer is formed on the second metal layer.

A reflective layer is disposed over, e.g., formed on, the second passivation layer. A contact extends through a thickness of the second passivation layer. In example embodiments, the reflective layer is electrically coupled to the drain formed in the second metal layer positioned under the second passivation layer through the contact. In example embodiments, the reflective layer may include any suitable material including, for example, a metal (90%, 95% or greater than 95% metal), an alloy, a doped metal, or a dielectric reflective material, as described above. In alternative embodiments, the reflective layer includes a suitable diffuse reflective material deposited on or over the second passivation layer.

In certain embodiments, a suitable dielectric barrier layer is formed on or over the reflective layer and over the TFT structure. For example, the dielectric barrier layer may be deposited on the reflective layer. The dielectric barrier layer may be formed from various materials including one or more organic material layers or a combination of organic and inorganic material layers. In certain embodiments, an organic material layer is formed over, e.g., deposited on, a portion of the dielectric barrier layer near and/or under the pixel wall portions. The organic material layer may include any suitable organic material including, without limitation, a polyacrylate, an epoxy, or a polyimide material, and combinations thereof. A hydrophobic layer, such as an amorphous fluoropolymer layer forming a bottom surface of the electrowetting pixel regions, is formed over the dielectric barrier layer and, in certain embodiments, over the organic material layer. The dielectric barrier layer may at least partially separate the TFT structure from the hydrophobic layer. More specifically, in one embodiment, the dielectric barrier layer at least partially separates the reflective layer from the hydrophobic layer.

At block 304, a plurality of pixel wall portions forming a patterned electrowetting pixel grid pattern is formed over the first support plate. In the example embodiment, one or more pixel wall portions form a patterned electrowetting pixel grid pattern over, e.g., on, the hydrophobic layer. The pixel wall portions may include a photoresist material such as, for example, an epoxy-based negative photoresist material SU-8. The patterned electrowetting pixel grid pattern includes a plurality of rows and a plurality of columns of pixel wall portions that form a perimeter of each electrowetting pixel region in an array of electrowetting pixel regions. Each electrowetting pixel region may have a width and a height in a range of about 50 to 500 micrometers, for example, and, more particularly, in one embodiment, electrowetting pixel regions have a width of 60 micrometers and a height of 120 micrometers.

Figure 6:
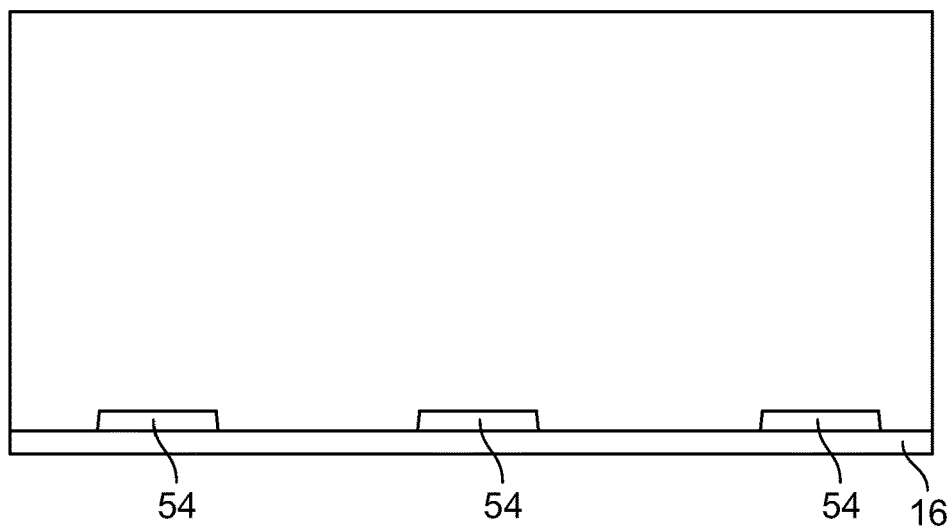

Referring further to FIGS. 5 and 6, a light-blocking layer, e.g., an organic material layer, such light-blocking layer 50, is formed 306 on a second support plate, e.g., top support plate 16. In example embodiments, the light-blocking layer includes a suitable black matrix material forming a plurality of light-blocking portions 54 in a first grid pattern 55, as shown in FIG. 5, for example. In certain embodiments, the light-blocking layer is deposited on a surface of the second support plate using a suitable deposition process or a suitable printing process, e.g., an ink jet printing process. For example, in one example embodiment, at block 306, a photoresist material is deposited on a first surface of the second support plate. The photoresist material is patterned to form a patterned photoresist material and the patterned photoresist material is developed to form the light-blocking layer including a plurality of light-blocking portions, such as light-blocking portions 54. More specifically, in one embodiment, at block 306, the photoresist material is deposited on top support plate 16. Once the photoresist material is deposited, a photomask is positioned over the photoresist material and the photoresist material is exposed to ultra-violet (UV) light through the photomask. The photoresist material is then patterned and developed to form the light-blocking layer including a first grid pattern of a plurality of interconnected light-blocking portions. In alternative embodiments, these structures may be printed using suitable methods other than photolithography, including, without limitation, direct writing and electron beam lithography (EBL).

Figure 8:
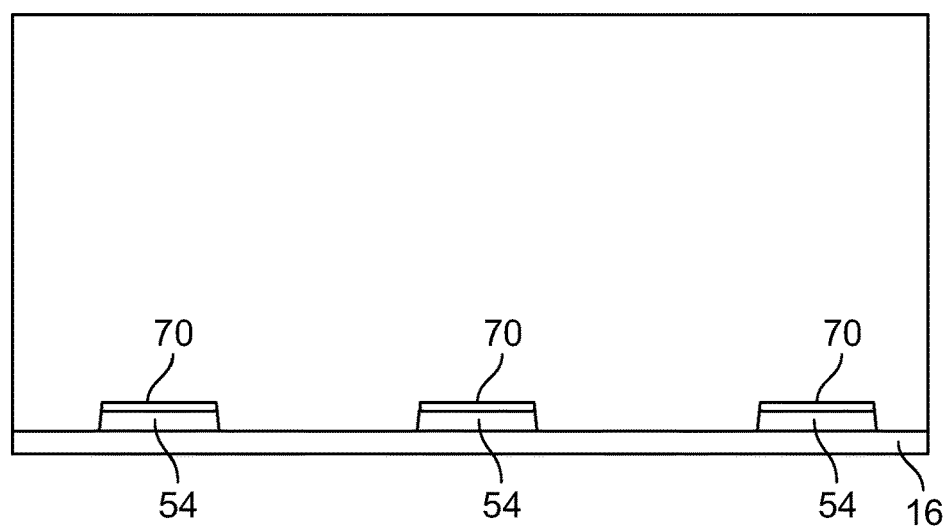

Referring to FIGS. 7 and 8, at block 308, an electrically conductive layer, such as an electrically conductive layer 28 forming common electrode 30, is formed over the second support plate, e.g., top support plate 16. In example embodiments, electrically conductive layer 28 is formed on light-blocking layer 50. More specifically, in example embodiments, electrically conductive layer 28 includes a plurality of electrically conductive portions 70 formed in a second grid pattern 71, as shown in FIG. 7. As shown in FIG. 7, second grid pattern 71 of electrically conductive portions 70 is disposed on and aligned with first grid pattern 55 of light-blocking portions 54 shown in FIG. 5 such that each electrically conductive portion 70 of electrically conductive layer 28 is disposed on and aligned with a respective light-blocking portion 54 of light-blocking layer 50. Referring to FIGS. 7 and 8, electrically conductive layer 28 is disposed on at least a portion of light-blocking layer 50, e.g., light-blocking portion 54, to contact light-blocking portion 54. In the embodiment shown, each electrically conductive portion 70 is aligned with and has a substantially identical width to the respective light-blocking portion 54 on which it is disposed. In example embodiments, the "self-aligning" electrically conductive portion 70 can be formed on a respective light-blocking portion 54 using an example method as illustrated in FIGS. 9-12.

Figure 9:
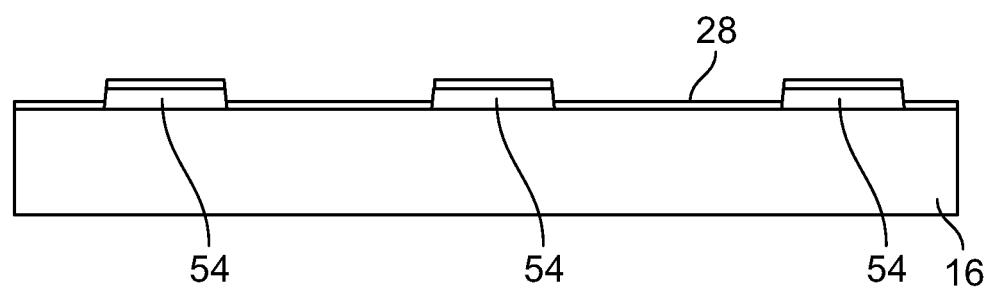
Figure 10:
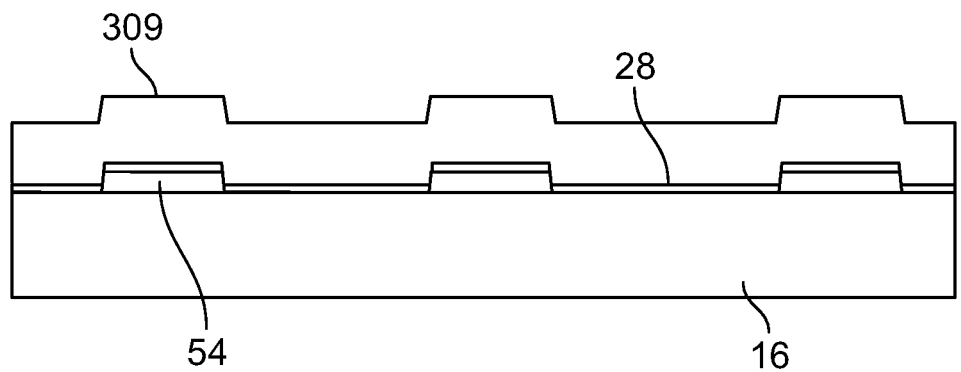
Figure 11:
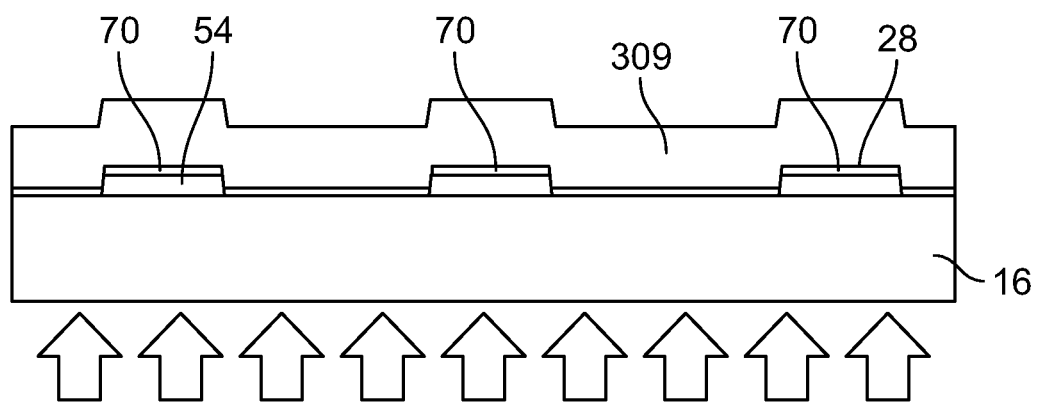

Referring to FIGS. 9-12, a transparent electrically conductive layer 28, such as an indium tin oxide (ITO) layer, is formed on the support plate and the light-blocking layer using a suitable deposition process, for example. In this embodiment, at block 308, the ITO layer is applied directly on a surface of the light-blocking layer using a suitable sputtering process, as illustrated in FIG. 9. A positive tone photoresist layer 309 is then formed, e.g., deposited, on electrically conductive layer 28 as shown in FIG. 10. Once positive tone photoresist material 309 is deposited on the ITO layer, the ITO layer and the positive tone photoresist layer are exposed to a suitable UV light through support plate 16 utilizing light-blocking layer 50 as a photomask. For example, in one embodiment, during step 308, an ultra-violet (UV) light source (not shown) is positioned adjacent a second surface of support plate 16 opposite the first surface, as illustrated in FIG. 11, and the positive tone photoresist layer and the electrically conductive layer are exposed to a portion of UV light (as indicated by arrows in FIG. 11) emitted by the UV light source that propagates through support plate 16. More specifically, a portion of the UV light emitted by the UV light source impinges on and is absorbed by light-blocking portions 54. Portions of the UV light not absorbed by light-blocking portions 54 propagate through the transparent electrically conductive portions 70 to impinge on positive tone photoresist layer 309. As a result, portions of the electrically conductive material and the positive tone photoresist layer not protected from exposure to the UV light by the light-blocking portions are cured. The electrically conductive layer is patterned to form second grid pattern 71, as shown in FIG. 7, aligned with first grid pattern 55, shown in FIG. 5, and including a plurality of electrically conductive portions 70. Each electrically conductive portion 70 of the plurality of electrically conductive portions 70 is aligned with a respective light-blocking portion 54 of the plurality of light-blocking portions 54 of light-blocking layer 50. During this processing, positive tone photoresist layer 309 is developed using suitable developing techniques to remove portions of the positive tone photoresist material disposed on portions of the electrically conductive layer exposed to UV light.

Figure 12:
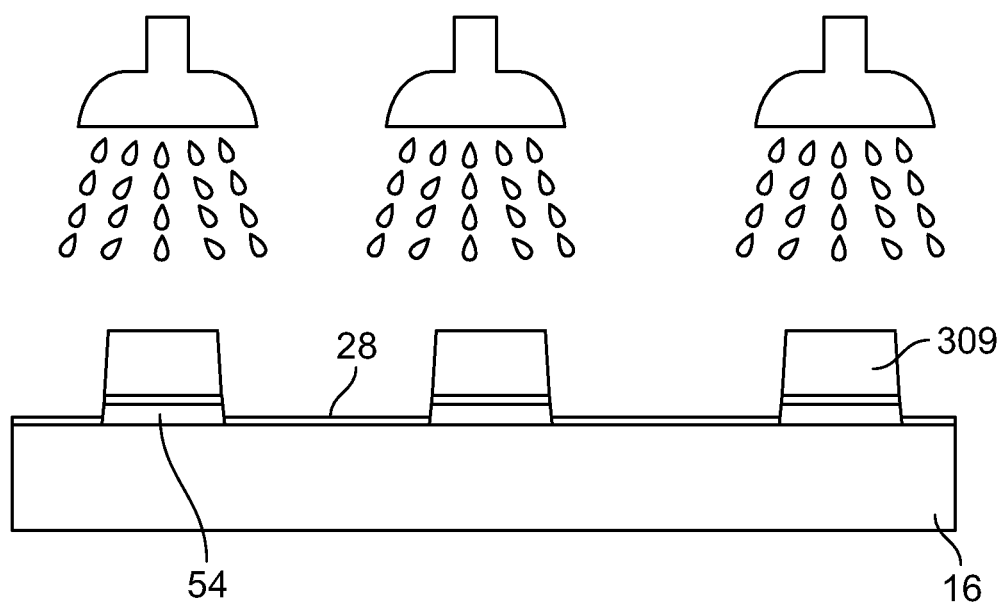

Referring to FIG. 12, portions of transparent electrically conductive layer 28, e.g., portions of the ITO material, exposed to the UV light are then removed using a wet-etching process and the remaining positive tone photoresist material is striped using a suitable stripping process to form the patterned electrically conductive layer as shown in FIGS. 7 and 8 forming a common electrode in a respective electrowetting pixel region. In example embodiments, the ITO layer is formed, e.g., deposited, directly on a surface of the light-blocking layer using a suitable deposition process, such as a sputtering technique, and the ITO layer is patterned using a photolithography technique utilizing the light-blocking layer as a photomask. The black matrix material forming the light-blocking portions of the light-blocking layer absorbs UV light while the ITO layer and the glass support plate are transparent to UV light. As a result, the ITO layer can be patterned by exposing the ITO layer and the overlying photoresist layer to UV light using a backside UV light source, with the light-blocking layer acting as a photomask in combination with a positive tone photoresist material. Because the electrically conductive layer is formed directly on the light-blocking layer, there is no air gap between the layers, i.e., a hard contact exposure method; therefore, unlike conventional processing methods, no light collimation is required to provide the desired shape and/or dimensions of the photoresist material identical to the corresponding shape and/or dimensions formed through the photomask. Further, conventional UV light sources, such as a suitable mercury lamp or UV LED array, can be used as the UV light source. Thus, tooling costs can be reduced.

In example embodiments, the light-blocking portion and the associated electrically conductive portion are self-aligned, i.e., the second grid pattern of the electrically conductive layer is identical to the underlying first grid pattern of the light-blocking layer. In contrast to conventional processing methods, an overlay, i.e., an amount of misalignment between the light-blocking portion and the electrically conductive portion, will inherently be substantially zero. As a result, a width of the light-blocking portions is finer or narrower to enhance light propagation into the associated electrowetting pixel region. Moreover, fewer photomask are needed to fabricate the electrowetting display device using example method 300 described herein.

Figure 13:
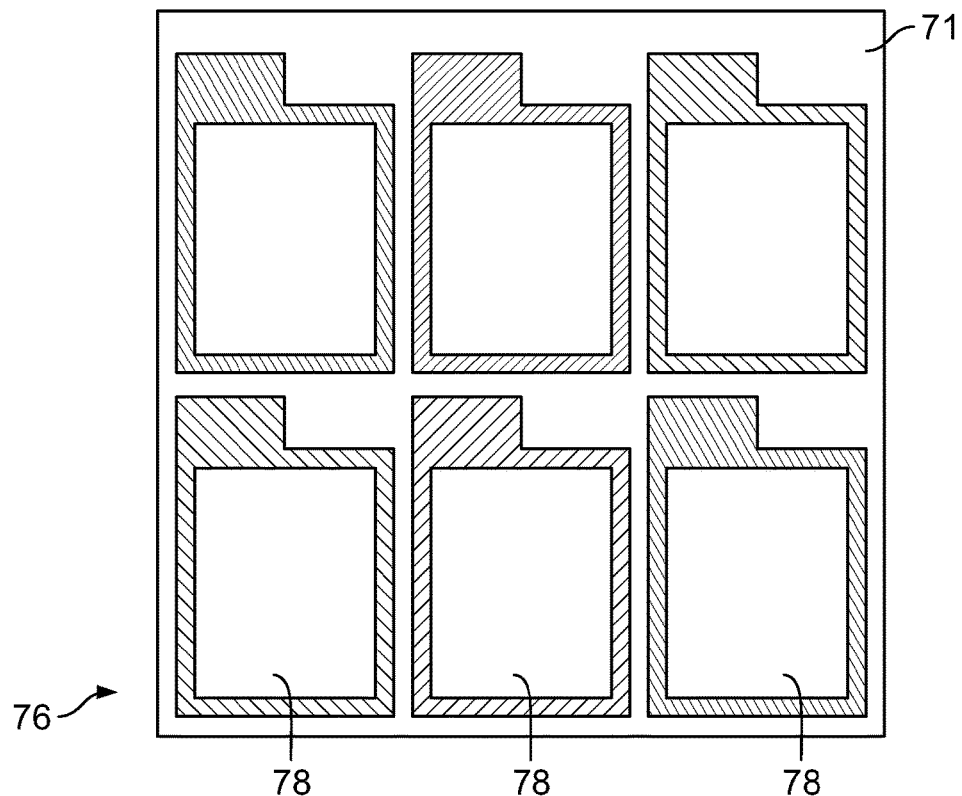
Figure 14:
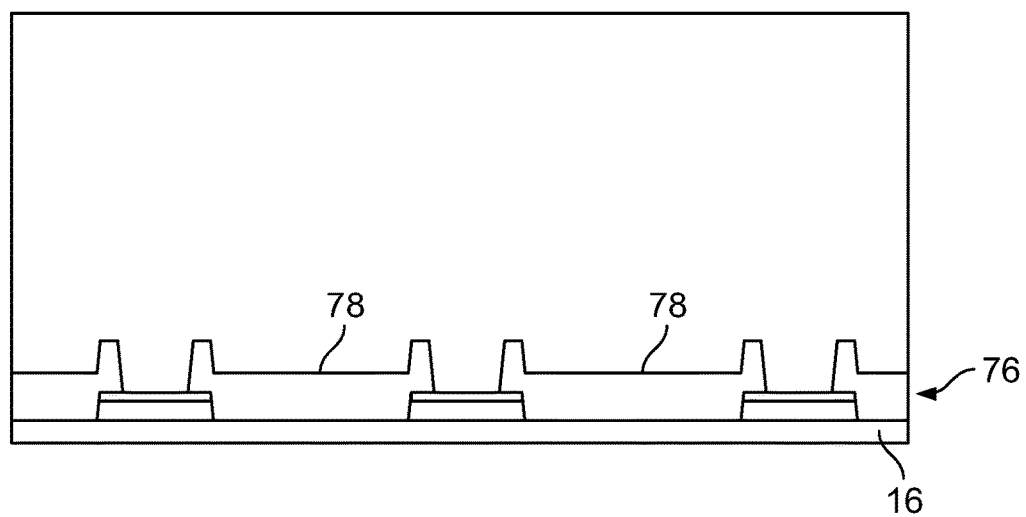

At block 310, a color filter layer, such as color filter layer 76 shown in FIGS. 13 and 14, is formed over top support plate 16 and coplanar with light-blocking layer 50, e.g., disposed on inner surface 52 of top support plate 16 adjacent light-blocking portion 54. A photoresist material is deposited over the electrically conductive layer to cover the electrically conductive portions and the voids between adjacent electrically conductive portions. Referring further to FIGS. 13 and 14, the photoresist material is patterned to form a patterned photoresist material and the patterned photoresist material is developed to form a plurality of color filter portions, such as color filter portions 78. In one embodiment, at block 310, once the photoresist material is deposited, a photomask is positioned over the photoresist material and the photoresist material is exposed to UV light through the photomask to form the plurality of color filter portions. In alternative embodiments, these structures may be printed using suitable methods other than photolithography, including, without limitation, direct writing and electron beam lithography (EBL).

In this embodiment, each color filter portion is positioned between adjacent light-blocking portions such that the light-blocking portions at least partially form a perimeter of the associated color filter portion. While a portion of the color filter portion may overlap or extend onto an edge of the respective electrically conductive portions formed on respective light-blocking portions, the color filter portion is removed from the surface of at least a portion of the electrically conductive portion. As described above, each color filter portion may be a red color filter portion, a green color filter portion, a blue color filter portion, or a transparent (white) color filter portion.

Figure 15:
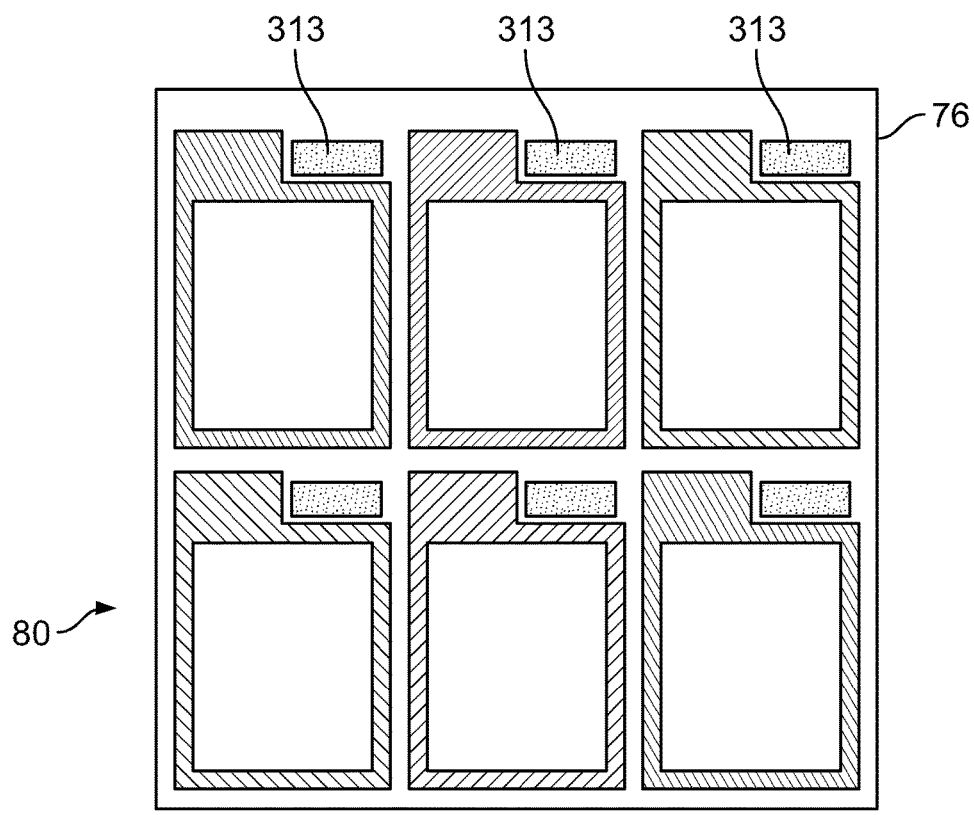
Figure 16:
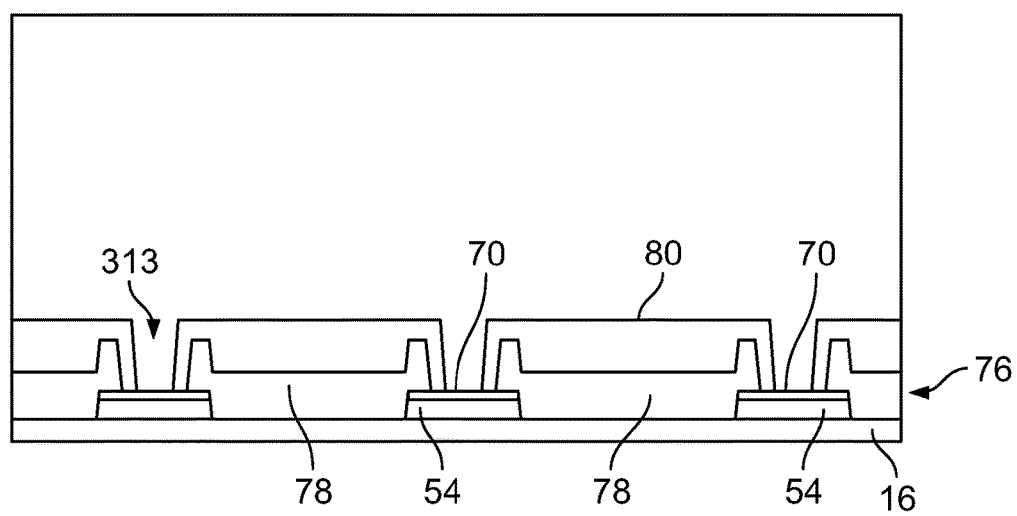

At block 312, a layer having a photo-definable material, such as a suitable conforming layer or a suitable planarization layer, e.g., as organic conforming layer 80, is disposed over, e.g., deposited or formed on, the color filter layer to cover each color filter portion as shown in FIGS. 15 and 16. In example embodiments, a photoresist material is disposed over electrically conductive layer 28 and color filter layer 76 to cover color filter portions 78 and form a recessed region or trench, such as recessed region 74, aligned with, e.g., positioned over, electrically conductive portions 70 between adjacent color filter portions 78. In a particular embodiment, an opening 313 is formed through the layer having a photo-definable material, e.g., conforming layer 80, to form recessed region 74 and provide communication between electrically conductive portion 70 and an electrolyte solution disposed in the associated electrowetting pixel region 12. Referring further to FIGS. 15 and 16, the photoresist material is patterned to form a patterned photoresist material and the patterned photoresist material is developed to form the layer having a photo-definable material on each color filter portion 78. In one embodiment, at block 312, once the photoresist material is deposited, a photomask is positioned over the photoresist material and the photoresist material is exposed to UV light through the photomask to form the layer having recessed regions 74. In alternative embodiments, these structures may be printed using suitable methods other than photolithography, including, without limitation, direct writing and electron beam lithography (EBL).

In this embodiment, the layer having a photo-definable material includes a plurality of portions disposed on or over a respective color filter portion. In particular embodiments, the layer may extend over the edges of the color filter portions to contact the associated electrically conductive portions; however, the layer is removed from the surface of at least a portion of the electrically conductive portion to partially form the recessed region or trench aligned with, e.g., positioned over, the electrically conductive portion. As shown in FIG. 16, conforming layer 80 forms recessed region 74 aligned with, e.g., positioned over, electrically conductive portion 70. In certain embodiments, recessed region 74 will have a width of 15.0 micrometers to 20.0 micrometers along a width of electrically conductive portion 70 and a height of 1.0 micrometer to 5.0 micrometers perpendicular to the width of recessed region 74. The recessed region, such as recessed region 74, is aligned over the hydrophobic surface of the electrowetting pixel region, such as over first liquid collection area 56 of electrowetting pixel region 12 in which first fluid 32 forms droplet 58 with first fluid 32 in a contracted state.

Figure 17:
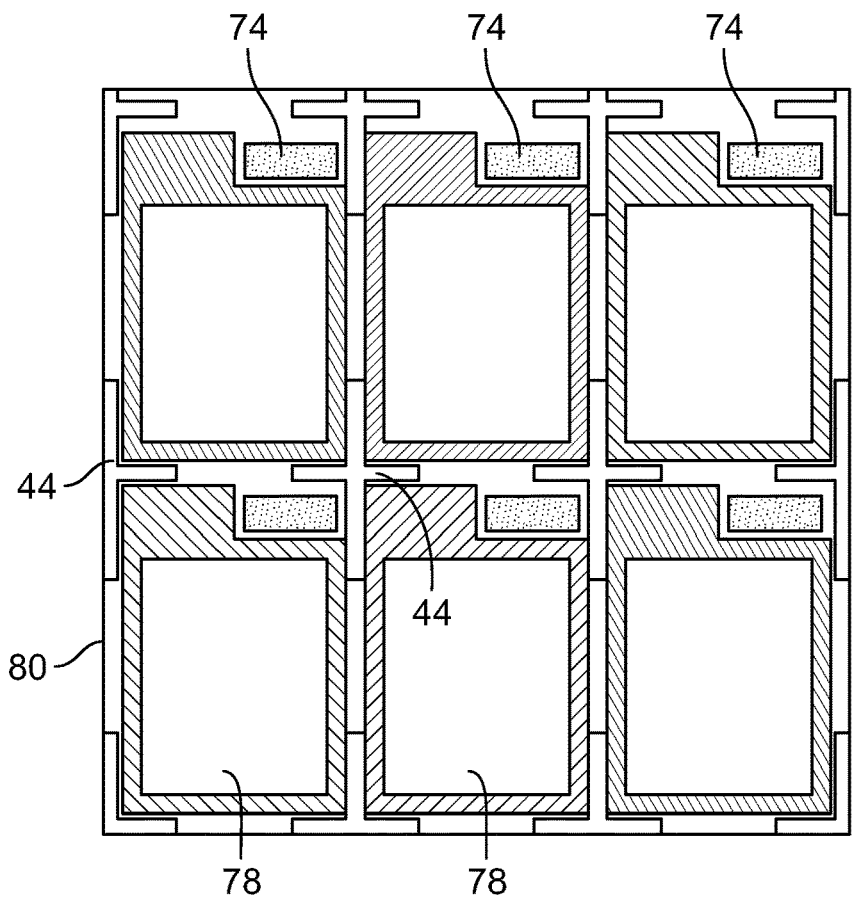
Figure 18:
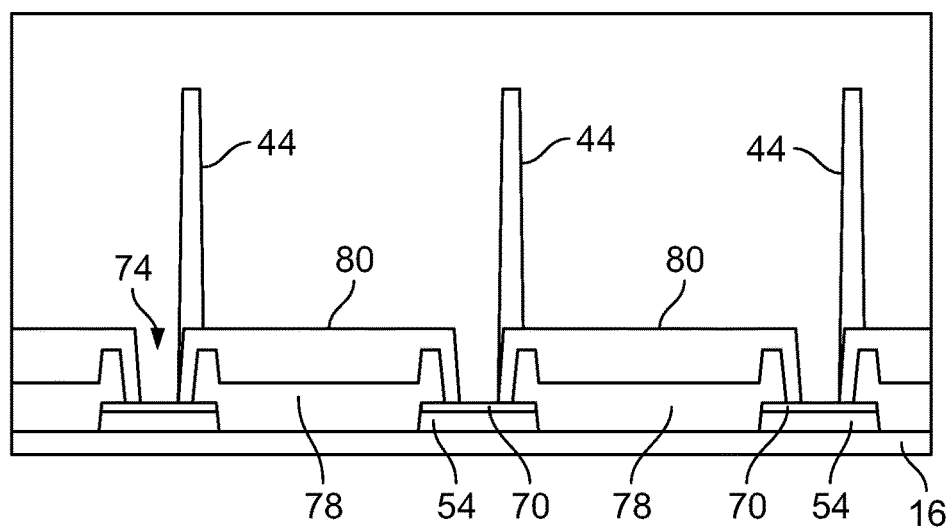

At block 314, at least one spacer 44 is formed over top support plate 16 and on conforming layer 80 adjacent recessed region 74, as shown in FIGS. 17 and 18. Multiple spacers 44 may be interspersed throughout the electrowetting pixel grid pattern. In example embodiments, the spacers, such as spacers 44, are formed over top support plate 16 to align with respective pixel wall portions 22 when top support plate 16 is coupled to bottom support plate 14. More specifically, in example embodiments, method 300 includes forming hydrophobic layer 40 over bottom support plate 14. A plurality of pixel wall portions 22 is then formed on hydrophobic layer 40. The plurality of pixel wall portions 22 forms a perimeter of a pixel region 12. With spacer 44 aligned with at least one pixel wall portion 22 of the plurality of pixel wall portions 22, top support plate 16 is coupled to bottom support plate 12. In these embodiments, a height of spacer 44 and at least a portion of a height of the at least one pixel wall portion 22 define a distance between an inner surface of conforming layer 80 and an inner surface of hydrophobic layer 40. In certain example embodiments, spacer 44 is coupled to and extends between surface 94 of conforming layer 80 to contact a contact surface on a first or distal end of corresponding pixel wall portions 22. In this arrangement, a contact surface of spacer 44 contacts a contact surface of corresponding pixel wall portion 22 to provide a stable contact joint at an interface between pixel wall portion 22 and spacer 44, providing mechanical strength at the interface that is less sensitive to overflow and/or leakage of first fluid 32 and/or second fluid 34 contained within electrowetting pixel regions 12.

In one embodiment, at block 314, a photoresist material is deposited over the layers formed on top support plate 16. The photoresist material is exposed to a photomask to form each spacer. Referring to FIGS. 17 and 18, once the photoresist material is deposited, a photomask is positioned over the photoresist material and the photoresist material is exposed to UV light through the photomask. In alternative embodiments, these structures may be printed using suitable methods other than photolithography, including, without limitation, direct writing and electron beam lithography (EBL). The spacers can be at least partially transparent so as to not hinder throughput of light in the electrowetting display. The transparency of the spacers may at least partially depend on the refractive index of the spacer material, which can be similar to or the same as the refractive indices of surrounding media. The spacers may also be chemically inert to surrounding media.

A first fluid and a second fluid (e.g., the oil and the liquid electrolyte solution) can be disposed in the electrowetting pixel regions of the electrowetting display device. The second support plate is coupled to the electrowetting display device. The second support plate is positioned opposite the first support plate, forming opposing outer surfaces of the electrowetting display device. The first support plate is then coupled to the second support plate. With the first support plate coupled to the second support plate, the electrically conductive portion is positioned over a first liquid collection area on the hydrophobic surface of the electrowetting pixel region and the electrically conductive portion is in communication with the second fluid, e.g., the liquid electrolyte solution, via the recessed region formed by the conforming layer. A spacer is coupled between the conforming layer and one or more respective pixel wall portions such that a distance between the hydrophobic surface of the electrowetting pixel region and the conforming layer is defined by a height of the spacer and at least a portion of a height of the associated one or more pixel wall portions.

In an example method for fabricating at least a portion of an electrowetting display device, a light-blocking layer including a light-blocking portion is formed on a first surface of a support plate. An electrically conductive layer is formed on the light-blocking layer. The electrically conductive layer includes an electrically conductive portion contacting the light-blocking portion. A color filter layer is formed on the first surface of the support plate. The color filter layer is coplanar with the light-blocking layer. A conforming layer is formed on the color filter layer. The conforming layer forms a recessed region aligned with the electrically conductive portion. In one embodiment, an opening is formed through a thickness of the conforming layer to form the recessed region and provide communication between the electrically conductive portion and an electrolyte solution disposed in the pixel region.

In example embodiments, the electrically conductive layer is wet-etched and a portion of the photoresist layer and a portion of the electrically conductive layer exposed to the UV light are removed. A spacer is formed on the conforming layer, positioned adjacent the recessed region. A hydrophobic layer is formed over a second support plate. A plurality of pixel wall portions is formed on the hydrophobic layer. The plurality of pixel wall portions forms a perimeter of a pixel region. The spacer is aligned with at least one pixel wall portion of the plurality of pixel wall portions. The first support plate is coupled to the second support plate, wherein a height of the spacer and at least a portion of a height of the at least one pixel wall portion define a distance between an inner surface of the conforming layer and an inner surface of a hydrophobic layer over the second support plate.

In certain embodiments, forming an electrically conductive layer on the light-blocking layer includes forming a transparent electrically conductive layer on the light-blocking layer, forming a photoresist layer on the electrically conductive layer, positioning an ultra-violet (UV) light source adjacent a second surface of the support plate opposite the first surface, and exposing the photoresist layer and the electrically conductive layer to UV light emitted by the UV light source and propagating through the support plate.

In certain embodiments, forming an electrically conductive layer on the light-blocking layer includes patterning the electrically conductive layer to form a second grid pattern aligned with the first grid pattern. The second grid pattern includes a plurality of electrically conductive portions. Each electrically conductive portion of the plurality of electrically conductive portions is aligned with a respective light-blocking portion of the plurality of light-blocking portions.

Figure 19:
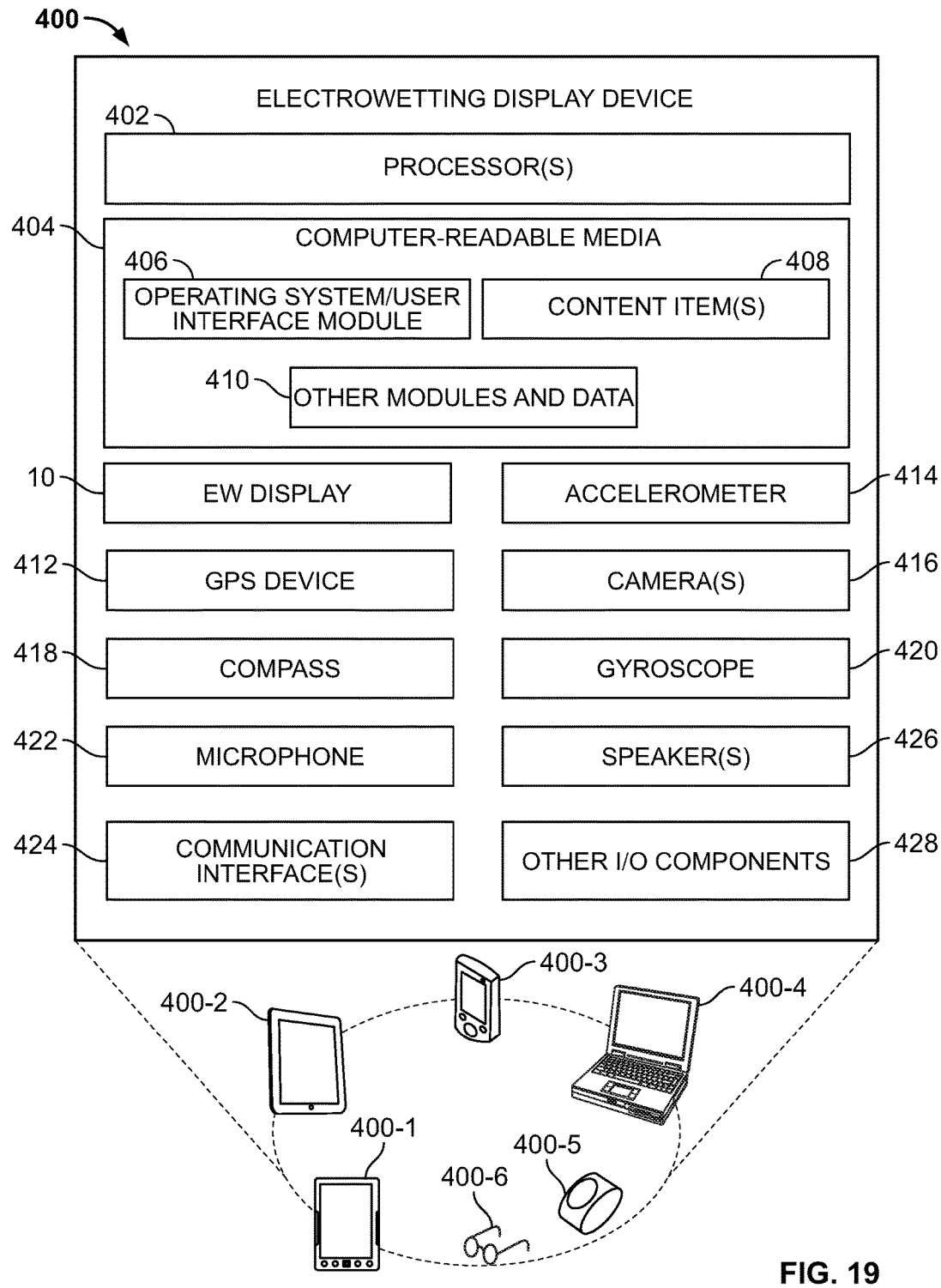
FIG. 19 illustrates an example electronic device that may incorporate an electrowetting display device, according to various embodiments.

In certain embodiments, forming a light-blocking layer including a light-blocking portion on a first surface of a support plate includes forming a first grid pattern including a plurality of light-blocking portions and forming an electrically conductive layer on the light-blocking layer comprises forming a second grid pattern including a plurality of electrically conductive portions, wherein the electrically conductive portion is disposed on the light-blocking portion. FIG. 19 illustrates select example components of an example image display apparatus 400 that may be used with electrowetting display device 10, for example, according to some implementations. Other types of displays may also be used with the example image display apparatus 400. Such types of displays include, but are not limited to, LCDs, cholesteric displays, electrophoretic displays, electrofluidic pixel displays, photonic ink displays, and the like.

Image display apparatus 400 may be implemented as any of a number of different types of electronic devices. Some examples of image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with electrowetting display device 100 and including a processor and memory for controlling the display according to the techniques described herein.

In a very basic configuration, image display apparatus 400 includes, or accesses, components such as at least one control logic circuit, central processing unit, or processor 402, and one or more computer-readable media 404. Each processor 402 may itself comprise one or more processors or processing cores. For example, processor 402 can be implemented as one or more microprocessors, microcomputers, microcontrollers, digital signal processors, central processing units, state machines, logic circuitries, and/or any devices that manipulate signals based on operational instructions. In some cases, processor 402 may be one or more hardware processors and/or logic circuits of any suitable type specifically programmed or configured to execute the algorithms and processes described herein. Processor 402 can be configured to fetch and execute computer-readable instructions stored in computer-readable media 404 or other computer-readable media. Processor 402 can perform one or more of the functions attributed to timing controller 102, source driver 104, and/or gate driver 106 of electrowetting display device 100. Processor 402 can also perform one or more functions attributed to a graphic controller (not illustrated) for the electrowetting display device.

Depending on the configuration of image display apparatus 400, computer-readable media 404 may be an example of tangible non-transitory computer storage media and may include volatile and nonvolatile memory and/or removable and non-removable media implemented in any type of technology for storage of information such as computer-readable instructions, data structures, program modules or other data. Computer-readable media 404 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, image display apparatus 400 may access external storage, such as RAID storage systems, storage arrays, network attached storage, storage area networks, cloud storage, or any other medium that can be used to store information and that can be accessed by processor 402 directly or through another computing device or network. Accordingly, computer-readable media 404 may be computer storage media able to store instructions, modules or components that may be executed by processor 402.

Computer-readable media 404 may be used to store and maintain any number of functional components that are executable by processor 402. In some implementations, these functional components comprise instructions or programs that are executable by processor 402 and that, when executed, implement operational logic for performing the actions attributed above to image display apparatus 400. Functional components of image display apparatus 400 stored in computer-readable media 404 may include the operating system and user interface module 406 for controlling and managing various functions of image display apparatus 400, and for generating one or more user interfaces on electrowetting display device 100 of image display apparatus 400.

In addition, computer-readable media 404 may also store data, data structures and the like, that are used by the functional components. For example, data stored by computer-readable media 404 may include user information and, optionally, one or more content items 408. Depending on the type of image display apparatus 400, computer-readable media 404 may also optionally include other functional components and data, such as other modules and data 410, which may include programs, drivers and so forth, and the data used by the functional components. Further, image display apparatus 400 may include many other logical, programmatic and physical components, of which those described are merely examples that are related to the discussion herein. Further, while the figures illustrate the functional components and data of image display apparatus 400 as being present on image display apparatus 400 and executed by processor 402 on image display apparatus 400, it is to be appreciated that these components and/or data may be distributed across different computing devices and locations in any manner.

FIG. 19 further illustrates examples of other components that may be included in image display apparatus 400. Such examples include various types of sensors, which may include a GPS device 412, an accelerometer 414, one or more cameras 416, a compass 418, a gyroscope 420, a microphone 422, and so forth.

Image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. Communication interfaces 424 may further allow a user to access storage on or through another device, such as a remote computing device, a network attached storage device, cloud storage, or the like.

Image display apparatus 400 may further be equipped with one or more speakers 426 and various other input/output (I/O) components 428. Such I/O components 428 may include a touchscreen and various user controls (e.g., buttons, a joystick, a keyboard, a keypad, etc.), a haptic or tactile output device, connection ports, physical condition sensors, and so forth. For example, operating system 406 of image display apparatus 400 may include suitable drivers configured to accept input from a keypad, keyboard, or other user controls and devices included as I/O components 428. Additionally, image display apparatus 400 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A display device, comprising:
   a first support plate having a top surface and an opposing bottom surface and a second support plate having a first surface and an opposing second surface;
   a pixel region between the top surface of the first support plate and the second surface of the second support plate, the pixel region including a plurality of pixel wall portions over the top surface of the first support plate forming a perimeter of the pixel region;
   a first liquid and a second liquid that is immiscible with the first liquid, the first liquid and the second liquid disposed in the pixel region;
   a light-blocking layer disposed on the second surface of the second support plate, the light-blocking layer including a light-blocking portion positioned over a first pixel wall portion of the plurality of pixel wall portions;
   an electrically conductive layer comprising an electrically conductive portion disposed on the light-blocking portion; and
   a conforming layer disposed over at least a portion of the second surface of the second support plate, the conforming layer including a recessed region aligned with the electrically conductive portion, wherein a portion of the second liquid is disposed within the recessed region and contacts the electrically conductive portion with the pixel region in an activate state.

2. The display device of claim 1, wherein the light-blocking portion includes a first side edge and an opposing second side edge, the display device further comprising:
   a first color filter portion disposed on the second surface of the second support plate adjacent the first side edge of the light-blocking portion, wherein the conforming layer is disposed on the first color filter portion.

3. The display device of claim 2, further comprising a second color filter portion disposed on the second surface of the second support plate adjacent the second side edge of the light-blocking portion opposing the first side edge, wherein the conforming layer is disposed on the second color filter portion and the recessed region is between the first color filter portion and the second color filter portion.

4. The display device of claim 1, further comprising:
   a hydrophobic layer disposed over the top surface of the first support plate; and
   a spacer coupled between the first pixel wall portion and the conforming layer, wherein a distance between the hydrophobic layer and a first surface of the conforming layer is defined by a height of the spacer and at least a portion of a height of the first pixel wall portion.

5. The display device of claim 1, wherein the electrically conductive layer comprises a transparent material.

6. The display device of claim 1, wherein the light-blocking layer includes a plurality of light-blocking portions forming a first grid pattern and the electrically conductive layer includes a plurality of electrically conductive portions forming a second grid pattern aligned with the first grid pattern, the second grid pattern providing a continuous common electrode for the display device.

7. The display device of claim 1, wherein the first liquid forms a droplet that extends into the recessed region with the first liquid in a contracted state.

8. The display device of claim 1, wherein the electrically conductive layer provides a common electrode associated with the pixel region, the display device further comprising:
   a reflective layer positioned over the first support plate in the pixel region; and
   an electrode layer positioned over the first support plate, the electrode layer coupled to the common electrode for creating a voltage differential between the electrode layer and the common electrode to cause displacement of the first liquid to expose at least a portion of the reflective layer.

9. The display device of claim 1, wherein the electrically conductive layer comprises an indium tin oxide (ITO) layer, and the electrically conductive portion comprises an ITO portion of the ITO layer.

10. A display device, comprising:
    a first support plate having a top surface and an opposing bottom surface and a second support plate having a first surface and an opposing second surface;
    a first sub-pixel between the top surface of the first support plate and the second surface of the second support plate, the first sub-pixel including a plurality of pixel wall portions over the first support plate forming a perimeter of the first sub-pixel;
    an oil and an electrolyte solution that is immiscible with the oil, the oil and the electrolyte solution in the first sub-pixel;
    a light-blocking layer disposed on the second surface of the second support plate, the light-blocking layer comprising a first light-blocking portion disposed over a first pixel wall portion of the plurality of pixel wall portions;

an electrically conductive layer comprising an electrically conductive portion disposed on the light-blocking portion;

a color filter layer disposed on the second surface of the second support plate, the color filter layer being coplanar with the light-blocking layer and comprising a first color filter portion adjacent the first light-blocking portion; and a layer having a photo-definable material disposed on the color filter layer, the layer comprising a recessed region aligned with the electrically conductive portion such that the electrolyte solution contacts the electrically conductive portion.

11. The display device of claim 10, wherein the electrically conductive layer comprises an indium tin oxide (ITO) layer disposed on the light-blocking layer, the ITO layer comprising a first ITO portion disposed on the first light-blocking portion.

12. The display device of claim 11, wherein the ITO layer provides a common electrode associated with the first sub-pixel, the display device further comprising:

a reflective layer disposed over the first support plate in the first sub-pixel; and an electrode layer positioned over the first support plate for creating, in conjunction with the common electrode, a voltage differential between the electrode layer and the common electrode to cause displacement of the oil in the first sub-pixel to expose at least a portion of the reflective layer.

13. The display device of claim 10, further comprising:
a hydrophobic layer over the first support plate; and
a spacer coupled between the first pixel wall portion and the layer having the photo-definable material, adjacent the recessed region, wherein a distance between the hydrophobic layer and the layer having the photo-definable material is defined by a height of the spacer and at least a portion of a height of the first pixel wall portion.

14. The display device of claim 10, further comprising a second sub-pixel between the first support plate and the second support plate and adjacent the first sub-pixel, wherein the color filter layer further comprises a second color filter portion in the second sub-pixel and adjacent the first light-blocking portion, and the layer having the photo-definable material is disposed on the second color filter portion to form the recessed region between the first color filter portion and the second color filter portion.

15. A display device, comprising:
a first support plate having a first surface;
a light-blocking layer including a light-blocking portion disposed on the first surface of the first support plate;
a transparent, electrically conductive layer on the light-blocking layer, the transparent electrically conductive layer including an electrically conductive portion disposed on the light-blocking portion;
a color filter layer disposed on the first surface of the first support plate, the color filter layer coplanar with the light-blocking layer, the color filter layer including a color filter portion adjacent the light-blocking portion; and
a conforming layer disposed on the color filter layer, the conforming layer including a recessed region extending through a thickness of the conforming layer and aligned with the electrically conductive portion.

16. The display device of claim 15, wherein the light-blocking layer includes a plurality of light-blocking portions forming a first grid pattern and the transparent, electrically conductive layer includes a plurality of electrically conductive portions forming a second grid pattern aligned with the first grid pattern, the second grid pattern providing a continuous common electrode for the display device.

17. The display device of claim 16, wherein each electrically conductive portion of the plurality of electrically conductive portions is aligned with and disposed on a respective light-blocking portion of the plurality of light-blocking portions.

18. The display device of claim 15, further comprising:
a spacer on the conforming layer, the spacer positioned adjacent the recessed region;
a second support plate coupled to the first support plate, the second support plate having a first surface;
a hydrophobic layer disposed over the first surface of the second support plate; and
a plurality of pixel wall portions on the hydrophobic layer, the plurality of pixel wall portions forming a perimeter of a pixel region, wherein the spacer is coupled to a first pixel wall portion of the plurality of pixel wall portions and a height of the spacer and at least a portion of a height of the first pixel wall portion define a distance between the conforming layer and the hydrophobic layer.

19. The display device of claim 15, further comprising:
a second support plate coupled to the first support plate, the second support plate having a first surface; and
a plurality of pixel wall portions over the first surface of the second support plate, the plurality of pixel wall portions forming a perimeter of a pixel region.

20. The display device of claim 19, further comprising a first liquid and a second liquid that is immiscible with the first liquid, the first liquid and the second liquid disposed in the pixel region, wherein the recessed region comprises an opening to provide fluid communication between the electrically conductive portion and the second liquid.

* * * * *